US008134568B1

(12) United States Patent
Iwamoto et al.

(10) Patent No.: US 8,134,568 B1
(45) Date of Patent: Mar. 13, 2012

(54) FRAME BUFFER REGION REDIRECTION FOR MULTIPLE GRAPHICS ADAPTERS

(75) Inventors: Rick M. Iwamoto, Cupertino, CA (US); Franck R. Diard, Mountain View, CA (US); Brian D. Hutsell, Fort Worth, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1016 days.

(21) Appl. No.: 11/013,078

(22) Filed: Dec. 15, 2004

(51) Int. Cl.
*G06F 15/167* (2006.01)
*G06F 12/10* (2006.01)
*G09G 5/36* (2006.01)

(52) U.S. Cl. ......................... 345/541; 345/568; 345/559

(58) Field of Classification Search .................... 345/87, 345/88, 89, 590, 606, 609, 501, 502, 520, 345/530, 531, 536, 541, 542, 544, 545, 559, 345/568
See application file for complete search history.

(56) References Cited

U.S. PATENT DOCUMENTS

| 3,492,538 | A | 1/1970 | Fergusson |
| 4,647,123 | A | 3/1987 | Chin et al. |
| 5,448,655 | A | 9/1995 | Yamaguchi |
| 5,502,808 | A | 3/1996 | Goddard et al. |
| 5,522,027 | A | 5/1996 | Matsumoto et al. |
| 5,784,628 | A | 7/1998 | Reneris |
| 5,794,016 | A | 8/1998 | Kelleher |
| 5,936,640 | A | 8/1999 | Horan et al. |
| 5,999,198 | A | 12/1999 | Horan et al. |
| 6,023,281 | A | 2/2000 | Grigor et al. |
| 6,111,757 | A | 8/2000 | Dell et al. |
| 6,191,800 | B1 | 2/2001 | Arenburg et al. |
| 6,195,734 | B1 | 2/2001 | Porterfield |
| 6,253,299 | B1* | 6/2001 | Smith et al. .................... 711/171 |
| 6,296,493 | B1 | 10/2001 | Michiya |
| 6,326,973 | B1 | 12/2001 | Behrbaum et al. |
| 6,329,996 | B1 | 12/2001 | Bowen et al. |
| 6,473,086 | B1 | 10/2002 | Morein et al. |
| 6,501,999 | B1 | 12/2002 | Cai |
| 6,535,939 | B1 | 3/2003 | Arimilli et al. |
| 6,593,932 | B2* | 7/2003 | Porterfield .................... 345/568 |
| 6,631,474 | B1 | 10/2003 | Cai et al. |

(Continued)

FOREIGN PATENT DOCUMENTS

EP 0428277 5/1991

(Continued)

OTHER PUBLICATIONS

"Alienware Announces Video Array and X2: An Exclusive Advancement in PC Graphics Technology", Alienware, May 12, 2004, <http://www.alienware.com/press_release_pages/press_release_template.aspx?FileName=press051204.asp>.

(Continued)

*Primary Examiner* — Joni Hsu
(74) *Attorney, Agent, or Firm* — Patterson & Sheridan, LLP

(57) ABSTRACT

A system and method for representing multiple prefetchable memory resources, such as frame buffers coupled to graphics devices, as a unified prefetchable memory space for access by a software application. A graphics surface may be processed by multiple graphics devices, with portions of the surface residing in separate frame buffers, each frame buffer coupled to one of the multiple graphics devices. One or more redirection regions may be specified within the unified prefetchable memory space. Accesses within a redirection region are transmitted to a prefetchable memory of a single graphics device. Accesses within the unified prefetchable memory space, but outside of any redirection region may be broadcast to all of the prefetchable memories of the multiple graphics devices.

16 Claims, 14 Drawing Sheets

U.S. PATENT DOCUMENTS

| | | | |
|---|---|---|---|
| 6,633,296 B1 * | 10/2003 | Laksono et al. | 345/502 |
| 6,683,614 B2 | 1/2004 | Walls et al. | |
| 6,711,638 B1 | 3/2004 | Wu | |
| 6,750,870 B2 | 6/2004 | Olarig | |
| 6,760,031 B1 | 7/2004 | Langendorf et al. | |
| 6,882,346 B1 | 4/2005 | LeFebvre et al. | |
| 6,902,419 B2 | 6/2005 | Conway et al. | |
| 6,919,896 B2 | 7/2005 | Sasaki et al. | |
| 7,030,837 B1 | 4/2006 | Vong et al. | |
| 7,176,847 B2 | 2/2007 | Loh | |
| 7,184,003 B2 | 2/2007 | Cupps et al. | |
| 2002/0047851 A1 | 4/2002 | Hirase et al. | |
| 2002/0093507 A1 | 7/2002 | Olarig | |
| 2002/0105523 A1 | 8/2002 | Behrbaum et al. | |
| 2002/0118201 A1 | 8/2002 | Mukherjee et al. | |
| 2003/0128216 A1 | 7/2003 | Walls et al. | |
| 2003/0137483 A1 | 7/2003 | Callway | |
| 2004/0072460 A1 | 4/2004 | Conway et al. | |
| 2004/0104913 A1 | 6/2004 | Walls et al. | |
| 2005/0017980 A1 | 1/2005 | Chang et al. | |
| 2005/0088445 A1 | 4/2005 | Gonzalez et al. | |
| 2005/0134588 A1 | 6/2005 | Aila et al. | |
| 2005/0160212 A1 | 7/2005 | Caruk | |
| 2005/0278559 A1 | 12/2005 | Sutardja et al. | |

FOREIGN PATENT DOCUMENTS

| | | |
|---|---|---|
| EP | 0571969 A2 | 12/1993 |
| FR | 2834097 A1 | 6/2003 |
| FR | 2839563 A1 | 11/2003 |
| JP | 5324583 A | 12/1993 |
| TW | 328392 | 3/1998 |
| TW | 570243 | 1/2004 |
| WO | WO 03/083636 A1 | 10/2003 |

OTHER PUBLICATIONS

"Alienware Promises Fastest Graphics Solution", Alienware, Jun. 28, 2004, <http://www.alienware.com/press_release_pages/press_release_template.aspx?FileName=press062804.asp>.

"Frequently Asked Questions", Alienware, Oct. 22, 2004, <http://www.alienware.com/alx_pages/main_content.aspx>.

Henry Fuchs, Distributing a visible surface algorithm over multiple processors, Proceedings of the 1977 annual conference, p. 449-451. Jan. 1977.

Edward Brown, Andy Thorne, "FireWire Audio Application utilizing high quality 96kHz 24bit I/O", Copyright Oxford Semiconductor 2004 © External—Free Release, Jul. 2004.

Wasson, "NVIDIA's SLI resurrects DPU teaming Kickin' it old school—with 32 pipes", www.techreport.com, Jun. 28, 2004. pp. 1-3, http://techreport.com/etc/2004q2/nvdia-sli/.

Weinand, "NVIDIA lance le SLI: une technologie multi-GDU", www.erenumerigue.fr, Jun. 29, 2004. pp. 1-7 http://www.erenumerique.fr/nvidia_lance_le_sli_une_technologie_multi_gpu-art-655-7.html.

Whitman, Scott, "Dynamic Load Balancing for Parallel Polygon Rendering," IEEE Computer Graphics and Applications, IEEE Inc., New York, vol. 14, No. 4, Jul. 1, 1994.

Marc Prieur, NVIDIA GeForce 6600 GT—HardWare.fr, Sep. 7, 2004, retrieved from http://www.hardware.fr/art/imprimer/514. pp. 1-23.

Engish translation of: Marc Prieur, "NVIDIA GeForce 6600 GT—HardWare.fr," Sep. 7, 2004, retrieved from http://www.hardware.fr/art/imprimer/514. pp. 1-24.

Scott Wasson, "NVIDIA's SLI Resurrects GPU Teaming: Kickin' It Old School—With 32 Pipes", Jun. 28, 2004, retrieved from http://techreport.com/articles.x/6931. 5 pgs.

PCT Search Report. Oct. 12, 2007.

Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

English Translation of: Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

Translated Search Report for ROC (Taiwan) Patent Application No. 094140479, provided as concise explanation of relevance of TW 570243 and TW 328392, date of completion Feb. 15, 2009.

Office Action. U.S. Appl. No. 10/991,169. Dated Apr. 14, 2009.

Office Action. U.S. Appl. No. 11/012,394. Dated Apr. 28, 2009.

Office Action. U.S. Appl. No. 10/950,609. Dated Feb. 26, 2009.

Final Office Action. U.S. Appl. No. 11/012,394 dtd. Nov. 6, 2009.

Angelly, Clay. "NVIDIA GeForce 6600 Series Preview," nvnews, published on Aug. 12, 2004 (available at URL: http://www.nvnews.net/previews/geforce_6600_series/).

Gotoh, Hirosige, "Weekly Overseas News: NVIDIA Dual-GPU Solutions," PCWatch home page, published on Jun. 29, 2004 (available at URL: http://pc.watch.impress.co.jp/docs/2004/0629/kaigai099.htm).

Gotoh, Hirosige, "Weekly Overseas News: Questions Many of NVIDIA's SLI," PC Watch home page, published on Aug. 30, 2004 (available at URL: http://pc.watch.impress.co.jp/docs/2004/0830/kaigai113.htm).

English translation of: Gotoh, Hirosige, "Weekly Overseas News: NVIDIA Dual-GPU Solutions," PCWatch home page, published on Jun. 29, 2004 (available at URL: http://pc.watch.impress.co.jp/docs/2004/0629/kaigai099.htm).

English translation of: Gotoh, Hirosige, "Weekly Overseas News: Questions Many of NVIDIA's SLI," PC Watch home page, published on Aug. 30, 2004 (available at URL: http://pc.watch.impress.co.jp/docs/2004/0830/kaigai113.htm).

Excepts from letter received from foreign associate re. JP Patent App. No. 2007-543190, dated Feb. 1, 2010, provided as explanation of relevance of foreign language references.

Sassen, Sander. "NVIDIA SLI, SLI's back with a vengeance," hardwareanalysis.com, Jun. 28, 2004.

Anand, Vijay. "NVIDIA's Scalable Link Interface (SLI)," HardwareZone.com, Jun. 30, 2004.

Office Action, U.S. Appl. No. 11/012,394 dated Jan. 20, 2011.

* cited by examiner

FRAME BUFFER REGION REDIRECTION FOR MULTIPLE GRAPHICS ADAPTERS

BACKGROUND OF THE INVENTION

1. Field of the Invention

Embodiments of the present invention generally relate to graphics processing, and more particularly to splitting a frame buffer between graphics adapters when multiple graphics adapters are installed in a system.

2. Description of the Related Art

Conventional graphics processing systems including a single graphics adapter typically have a single frame buffer that is accessed by an application program. In graphics processing systems including multiple graphics adapters, processing of an image is typically distributed across the multiple graphics adapters. The image is divided into portions corresponding to the distribution, and each portion is stored in a separate frame buffer coupled to one of the multiple graphics adapters. Consequently, the application program must access multiple frame buffers, each frame buffer storing a portion of the image, during the processing of the image. The application program must be aware of which frame buffer stores each portion of the image in order to correctly access the image.

Accordingly, it is desirable to present a unified frame buffer to an application program when multiple graphics adapters are installed in a graphics processing system. The unified frame buffer enables the application program to access the image without determining which of the multiple frame buffer stores each portion of the image.

SUMMARY OF THE INVENTION

The current invention involves new systems and methods for representing multiple prefetchable memory resources, such as frame buffers coupled to graphics devices, as a unified prefetchable memory space accessible by a software application. A graphics surface may be processed by multiple graphics devices, with portions of the surface residing in separate frame buffers, where each frame buffer is coupled to one of the multiple graphics devices. Within the unified prefetchable memory space, the one or more redirection regions may be specified. Accesses within a redirection region are transmitted to a prefetchable memory for a single graphics device. Accesses within the unified prefetchable memory space, but outside of any redirection region, may be simultaneously transmitted to one or more of the frame buffers of the multiple graphics devices.

Various embodiments of the invention include a bridge device, a first graphics device, and a second graphics device. The bridge device is configured to store values defining a redirection region within a prefetchable memory space. The first graphics device is coupled to the bridge device and has a first associated frame buffer which is configured to store a first portion of the redirection region. The second graphics device is coupled to the bridge device and has a second associated frame buffer which is configured to store a second portion of the redirection region.

Various embodiments of a method of the invention for accessing a frame buffer that is divided between multiple graphics devices as a unified frame buffer include determining whether the access is within a redirection region of a prefetchable memory space and outputting the access to one or more of the multiple graphics devices depending on whether an address associated with the access is either within the redirection region or within the prefetchable memory space and outside of the redirection region.

Various embodiments of the invention include a bridge device for interfacing between a host processor and multiple graphics devices. The bridge device includes a first register, redirection registers, and a memory access unit. The first register is configured to store a value specifying a prefetchable memory space. The redirection registers are configured to store a set of values specifying a redirection region within the prefetchable memory space. The memory access unit is configured to transmit accesses to one or more ports based on the first register and the redirection registers, wherein each of the one or more ports is coupled to a different one of the multiple graphics devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A single device driver interfaces between an application program and multiple graphics devices. Therefore, unlike a conventional system where there is a one to one correspondence between device drivers and graphics devices, the application program does not need to communicate with multiple device drivers to distribute processing to the multiple graphics devices. Furthermore, a unified frame buffer may be presented to the application program when the frame buffer is distributed between the multiple graphics devices.

Figure 1:
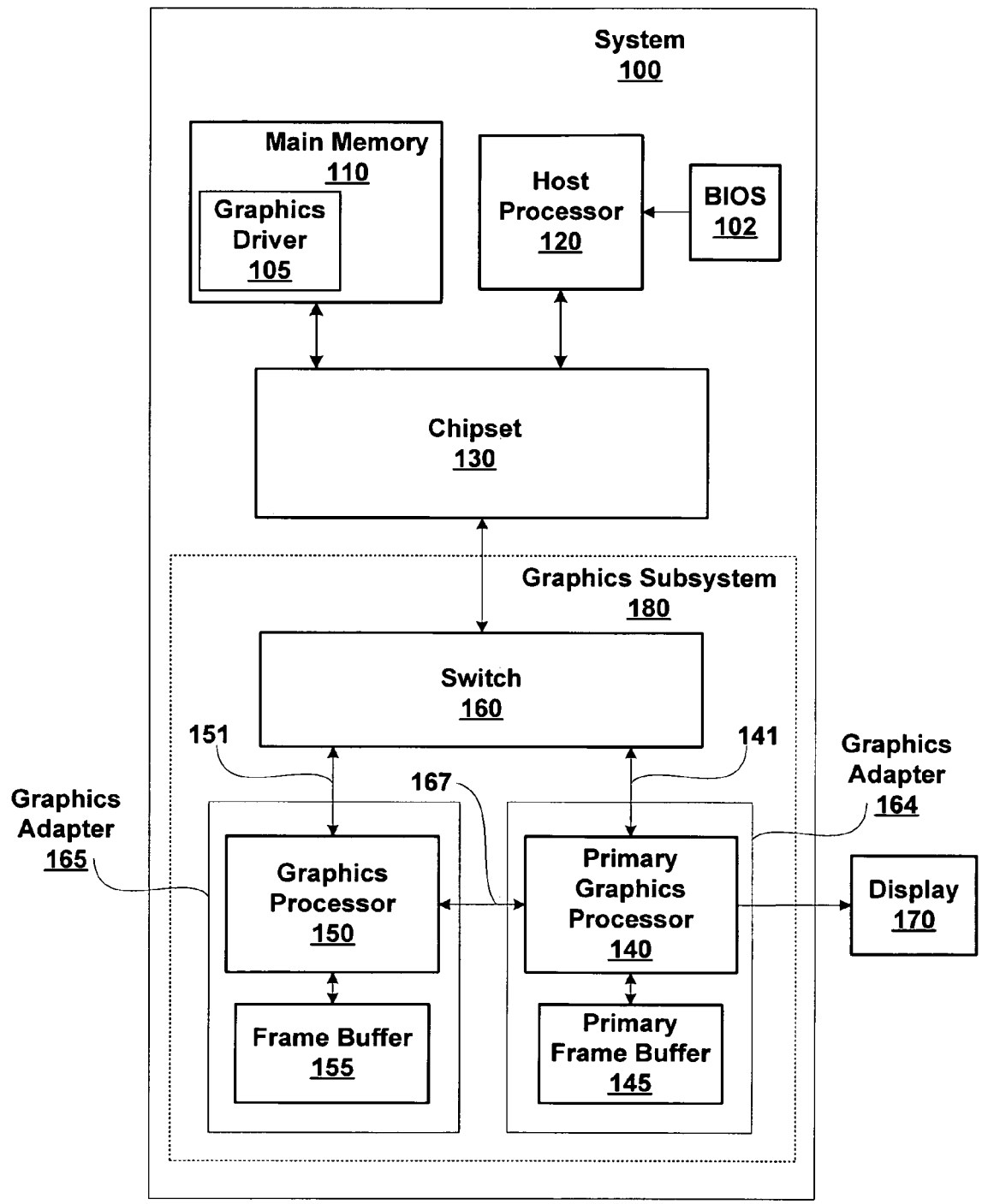
FIG. 1 is a block diagram of an exemplary embodiment of a multiple graphics adapter processing system in accordance with one or more aspects of the present invention.

FIG. 1 is an exemplary embodiment of a graphics processing system 100 including multiple graphics devices in accordance with one or more aspects of the present invention. System 100 may be a desktop computer, server, laptop computer, palm-sized computer, tablet computer, game console, cellular telephone, hand-held device, computer based simulator, or the like. System 100 includes a host processor 120, a BIOS 102, a main memory 110, and a chipset 130 that is directly coupled to a graphics subsystem 180. BIOS 102 is a program stored in ROM (read only memory) or flash memory that is run at bootup. Graphics subsystem 180 includes a bridge device, referred to as a switch 160, and multiple graphics devices, graphics adapter 164 and graphics adapter 165.

A single device driver, graphics driver 105, stored within main memory 110, configures the devices within graphics subsystem 180 and communicates between applications executed by host processor 120 and graphics adapters 165 and 164. In a conventional graphics processing system running the Windows® OS two device drivers are used, one for each graphics adapter installed in the system.

In some embodiments of system 100, chipset 130 may include a system memory switch and an input/output (I/O) switch that may include several interfaces such as, Advanced Technology Attachment (ATA) bus, Universal Serial Bus (USB), Peripheral component interface (PCI), or the like. Switch 160 provides an interface between chipset 130 and each of graphics adapter 165 and graphics adapter 164 when a first port and a second port of switch 160 are coupled to a connection 151 and a connection 141, respectively. In some embodiments of switch 160, switch 160 provides an indirect interface between graphics adapter 165 and graphics adapter 164 through the combination of connections 151 and 141. Connection 167 provides a direct connection between graphics adapter 165 and graphics adapter 164. In some embodiments of the present invention, connection 167 is omitted. Switch 160 may also include interfaces to other devices.

In some embodiments the present invention, transfers over connections 141 and 151 are performed by switch 160 using an industry standard protocol such as PCI-Express,™ and, in such cases, switch 160, graphics adapter 165 and graphics adapter 164, each include an interface unit corresponding to the industry standard protocol.

A primary graphics processor 140 within graphics adapter 164 outputs image data to a display 170. Display 170 may include one or more display devices, such as a cathode ray tube (CRT), flat panel display, or the like. Primary graphics processor 140 within graphics adapter 164 is also coupled to a primary frame buffer 145, which may be used to store graphics data, image data, and program instructions. At least a portion of primary frame buffer 145 is designated as frame buffer memory and is reported to a BIOS 102 during bootup of system 100 by graphics adapter 164 as a prefetchable memory space requirement. A graphics processor 150 within graphics adapter 165 is coupled to a frame buffer 155, which may also be used to store graphics data, image data, and program instructions. Likewise, at least a portion of frame buffer 155 is designated as frame buffer memory and is reported to BIOS 102 by graphics adapter 165 as a prefetchable memory space requirement.

Graphics driver 105 may configure graphics processor 150 and primary graphics processor 140 such that the graphics processing workload performed by system 100 is divided between graphics processor 150 and primary graphics processor 140 to produce the image data. For example, graphics processor 150 may process a larger portion of an image than primary graphics processor 140. In some embodiments of the present invention, graphics processor 150 may process the entire image and primary graphics processor 140 may receive the image data from graphics processor 150 via switch 160 or via connection 167. In other embodiments of the present invention, host processor 120 controls the transfer of the image data from graphics processor 150 to primary graphics processor 140.

Although system 100 as shown is a graphics processing system, alternate embodiments of system 100 may process other types of data, such as audio data, multi-media data, or the like. In those alternate embodiments, graphics processor 150 and primary graphics processor 140 would be replaced with other appropriate data processing devices. Likewise, graphics driver 105 would be replaced with a device driver corresponding to the data processing device.

Figure 2:
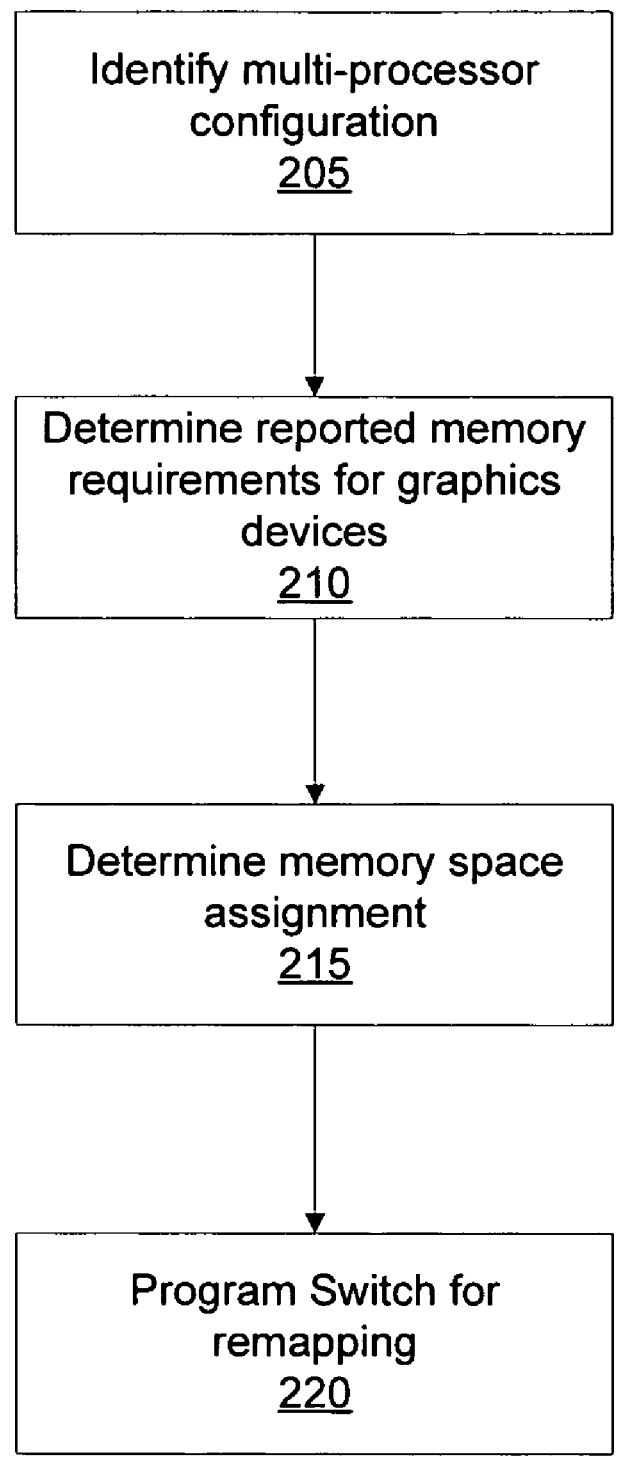
FIG. 2 is an exemplary embodiment of a method of initializing a switch device to interface with multiple graphics devices in accordance with one or more aspects of the present invention.

FIG. 2 is an exemplary embodiment of a method of initializing a switch device, such as switch 160 to enable a single device driver to interface with multiple graphics devices in accordance with one or more aspects of the present invention. In step 205 multiple graphics devices, such as graphics adapter 165 and graphics adapter 164 provide configuration information to BIOS 102 indicating that the multiple graphics adapters are installed.

An example of a multi-adapter configuration is a scalable link interface (SLI) configuration that permits multiple graphics devices to produce and combine image data for a single display device. In some embodiments of the present invention, multi-adapter configuration is fixed when system 100 is manufactured. For example, the multi-adapter configuration information may be fixed by providing hardwired inputs to each graphics processor. In other embodiments of the present invention, the multi-adapter configuration information is dynamic and is updated when a second or additional graphics adapter is installed in system 100. The multi-adapter configuration information, provided by each graphics device, may include an indication that one of the multiple graphics devices, such as graphics adapter 164 is a primary, e.g., master, graphics device that generates an output to display 170.

In step 210 the multiple graphics devices provide memory space requirements to BIOS 102. The reported memory space requirement for a graphics processor may include a register space that is non-prefetchable and other memory space, such as frame buffer memory, that is prefetchable. In some embodiments of the present invention, BIOS 102 may read registers within graphics processor 150 and primary graphics processor 140 to determine memory space requirements for each graphics processor. The amount of memory space reported to graphics driver 105 by each graphics processor via the registers read by BIOS 102, may vary dependent on the multi-adapter configuration.

Figure 3A:
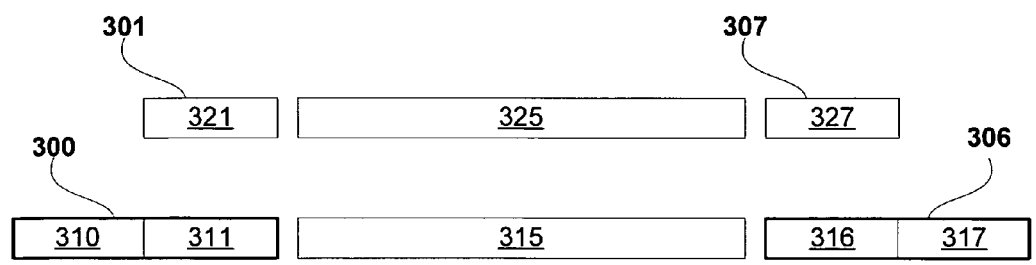
FIGS. 3A and 3B are exemplary conceptual diagrams of memory space assigned to multiple graphics devices in accordance with one or more aspects of the present invention.
Figure 3B:
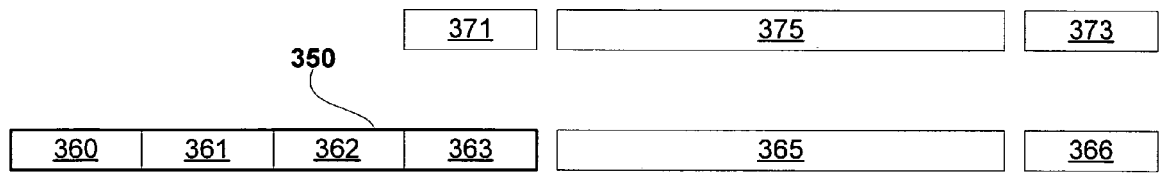
Figure 4A:
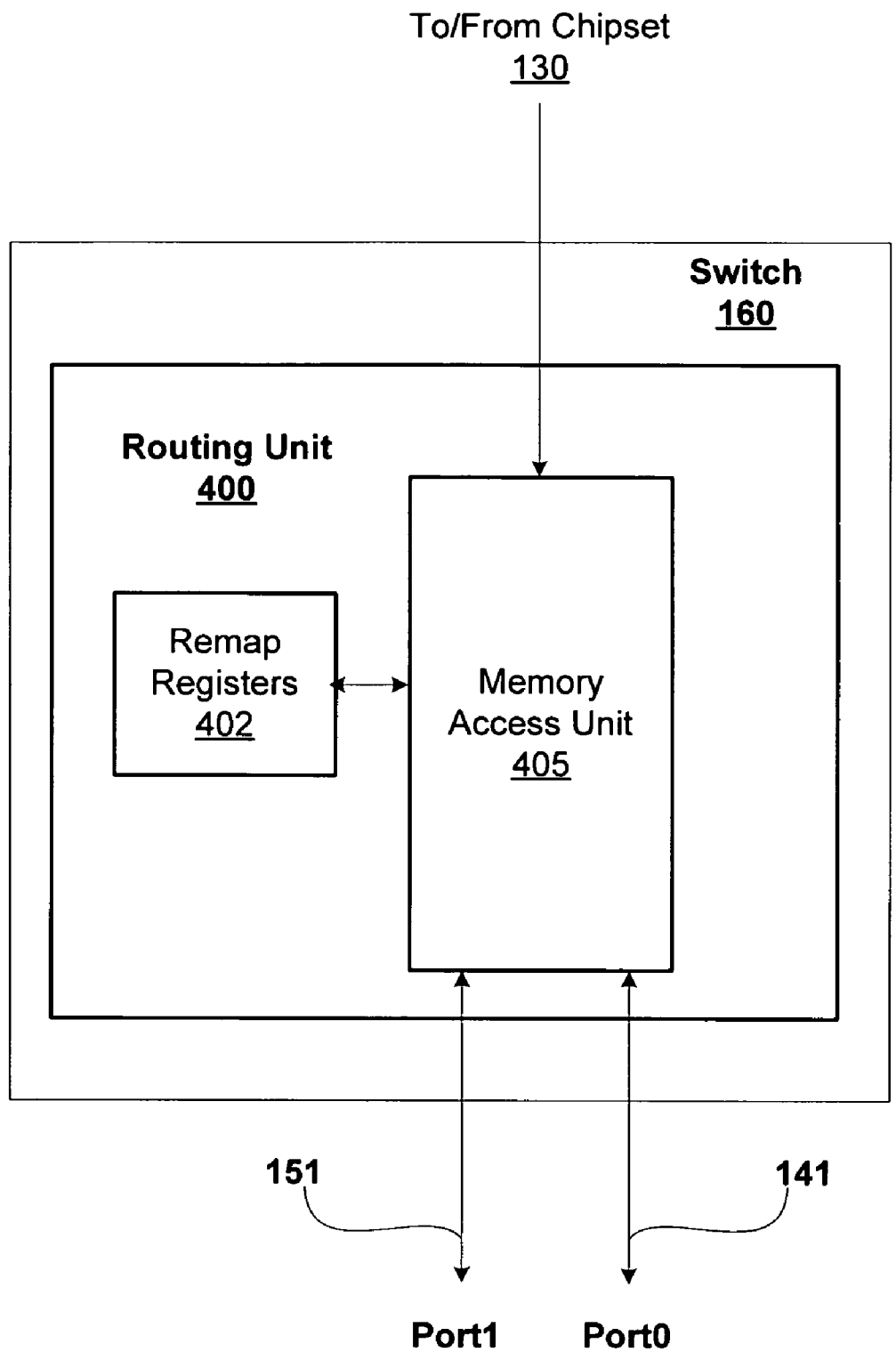
FIG. 4A is an exemplary embodiment of the switch device shown in FIG. 1 in accordance with one or more aspects of the present invention.

A graphics processor, such as graphics processor primary graphics processor 140 may report a bloated register space including the register space needed by graphics processor 150, as described in conjunction with FIGS. 3, 4A, and 6. In step 215 a portion of device address space, such as PCI address space, is claimed by the multiple graphics devices. The device address space assigned to the multiple graphics devices is shared by the multiple graphics devices. In some embodiments of the present invention, BIOS 102 selects an entire memory space reported by a single graphics device, including reported register space and memory space requirements. The device address space may include a bloated register space and/or bloated frame buffer memory space. Bloated spaces for a register space or for a frame buffer memory space are greater than the physical memory that is available within the graphics device reporting the bloated space requirement. By reporting a bloated space a single graphics device is able to report a memory space requirement for multiple graphics devices.

In step 220 switch 160 is programmed by graphics driver 105 to translate accesses within the device address space into accesses to a single graphics device or into accesses to the multiple graphics devices. Specifically, switch 160 is programmed to remap accesses within a bloated memory space, (register space or frame buffer memory space) to a single graphics device. For example, within the bloated space a remapping aperture is specified and accesses lying within the remapping aperture are directed to graphics adapter 165 and accesses lying outside of the remapping aperture are directed to graphics adapter 164.

FIG. 3A is an exemplary conceptual diagram of memory space requirements reported for multiple graphics devices in accordance with one or more aspects of the present invention. Graphics adapter 164 reports a bloated register space 300 including a register space 310 that is specific to graphics adapter 164 and a register space 311 that is specific to graphics adapter 165. Graphics adapter 164 includes physical storage for register space 310 and the physical storage for register space 311 is within graphics adapter 165. Graphics adapter 165 reports a register space that is not bloated, register space 321.

Graphics adapter 164 may be configured to report a bloated register space based on fixed or dynamic multi-adapter configuration information. For example, signals provided by pull-down or pull-up components, programmable registers, fuses, jumpers, switches, or the like, may be detected on at least one input to primary graphics processor 140. The signals may specific register space or memory space and whether or not the register or memory space should be reported to BIOS 102 as bloated. Likewise, signals may be detected on at least one input to graphics processor 150 which configure graphics adapter 165 to report register space or memory space that is not bloated.

Register space 310 may be bounded by addresses A0 and A1 and register space 311 may be bounded by addresses A1 and A2. Accesses received by switch 160 with addresses lying within register space 311 are redirected to graphics adapter 165. For example, in some embodiments of the present invention, addresses greater than or equal to A1 and less than A2 are translated into corresponding addresses within register space 321 which is bounded by addresses B0 and B1. In some embodiments of the present invention, register spaces 321 and 310 are used for configuration registers and are programmed by an application program via graphics driver 105.

Graphics adapter 164 reports another bloated register space 306 including a register space 316 that is specific to graphics adapter 164 and a register space 317 that is specific to graphics adapter 165. Graphics adapter 165 reports a register space that is not bloated, register space 327. For example, register space 316 is bounded by addresses I0 and I1 and register space 317 is bounded by physical addresses I1 and I2. Accesses received by switch 160 with addresses lying within register space 317 are remapped to graphics adapter 165. In some embodiments of the present invention, additional register spaces are reported by graphics adapter 164 and graphics adapter 165. In some embodiments of the present invention, register spaces 316 and 327 are instance registers used to store the locations of data structures stored in primary frame buffer 145 and frame buffer 155, respectively.

Graphics adapter 164 reports a frame buffer memory space 315 that is not bloated. As previously described, the multi-adapter configuration information may specify whether or not to bloat register spaces separately from frame buffer memory spaces. Graphics adapter 165 reports a frame buffer memory space 325 that is also not bloated. Frame buffer memory space 315 may be configured as a broadcast memory space, such that all accesses to addresses within frame buffer memory space 315 are broadcast to corresponding addresses in both graphics adapter 164 and graphics adapter 165. Specifically, frame buffer memory space 315 may be configured to broadcast write accesses and not broadcast read accesses. In some embodiments of the present invention, switch 160 is configured to transmit accesses to addresses within frame buffer memory space 315 only to frame buffer memory space 325, e.g., graphics adapter 165. In other embodiments of the present invention, a portion of frame buffer memory space 315 is configured as a redirection region as described in conjunction with FIGS. 5A, 5C, 6A, and 6B.

FIG. 3B is another exemplary conceptual diagram of memory space requirements reported for multiple graphics devices in accordance with one or more aspects of the present invention. Graphics adapter 164 reports a bloated register space 350 including register spaces 360 and 362 that are specific to graphics adapter 164 and register spaces 361 and 363 that are specific to graphics adapter 165. Graphics adapter 164 includes physical storage for register spaces 360 and 362 and the physical storage for register spaces 361 and 363 is within graphics adapter 165. Graphics adapter 165 reports a register spaces that are not bloated, register spaces 371 and 373.

As previously described in conjunction with FIG. 3A, graphics adapter 164 and graphics adapter 165 may each be configured to report a bloated register space based on fixed or dynamic multi-adapter configuration information. Register space 360 may be bounded by addresses A0 and A1, register space 361 may be bounded by addresses A1 and A2, register space 362 may be bounded by addresses A2 and A3, and register space 363 may be bounded by addresses A3 and A4. Accesses received by switch 160 with addresses lying within register space 361 are remapped to graphics adapter 165, specifically to register space 371. In some embodiments of the present invention, addresses greater than or equal to A1 and less than A2 are translated into corresponding addresses within register space 371 which is bounded by addresses B0 and B1. Accesses received by switch 160 with addresses lying within register space 363 are redirected to graphics adapter 165, specifically to register space 373. In some embodiments of the present invention, addresses greater than or equal to A3 and less than A4 are translated into corresponding addresses within register space 373 which is bounded by addresses I0 and I1.

Accesses may also be redirected to another register space within a graphics device. For example, Accesses received by switch 160 with addresses lying within register space 362 are redirected to register space 366 within graphics adapter 164. In some embodiments of the present invention, addresses greater than or equal to A2 and less than A3 are translated into corresponding addresses within register space 366 which is bounded by addresses I0 and I1.

Graphics adapter 164 reports a memory space 365 that is not bloated. As previously described, the multi-adapter configuration information may specify whether or not to bloat register spaces separately from frame buffer memory spaces. Graphics adapter 165 reports a frame buffer memory space 375 that is also not bloated. All accesses to addresses within frame buffer memory space 365 may be broadcast to frame buffer memory space 375 so that accesses within frame buffer memory space 365 are transmitted to corresponding addresses in both graphics adapter 164 and graphics adapter 165.

FIG. 4A is an exemplary embodiment of switch 160 shown in FIG. 1 in accordance with one or more aspects of the present invention. Although only a routing unit 400 is shown within switch 160, other subunits may be included to perform other functions. Routing unit 400 includes remap registers 402 and memory access unit 405. Remapping registers 402 may include one or more sets of registers where each set of registers corresponds to a particular remapping aperture. Remapping registers 402 may also include registers specific to each port, for example storing configuration information such as access enables for reading and writing each port or each memory space, e.g., register memory space or frame buffer memory space.

A set of registers within remap registers 402 is programmed by graphics driver 105 to store a value defining a remapping aperture within a register memory space or a frame buffer memory space. Specifically, a first set of registers may store a value, such as A1, defining the remapping aperture within bloated register space 300 shown in FIG. 3A. Similarly, a second set of registers may store a value, such as 11, defining the remapping aperture within bloated register space 306. In another example, the first set of registers may store a value, such as A1, and the second set of registers may store a value, such as A2, defining the remapping apertures within bloated register space 350 shown in FIG. 3B. In some embodiments of the present invention, additional registers may be included within routing unit 400 to store values defining additional remapping apertures or to define a minimum and maximum address specifying a remapping aperture.

Memory access unit 405 determines if an access received from chipset 130 lies within a remapping aperture defined by one or more values stored in remap registers 402. In addition to a value defining a remapping aperture, each set of registers within remap registers 402 may also include a register storing a remap base address for each port of switch 160. The remap base address for a particular port is used by memory access unit 405 to compute a remapped address for the particular port, as described in conjunction with FIG. 4B.

Figure 4B:
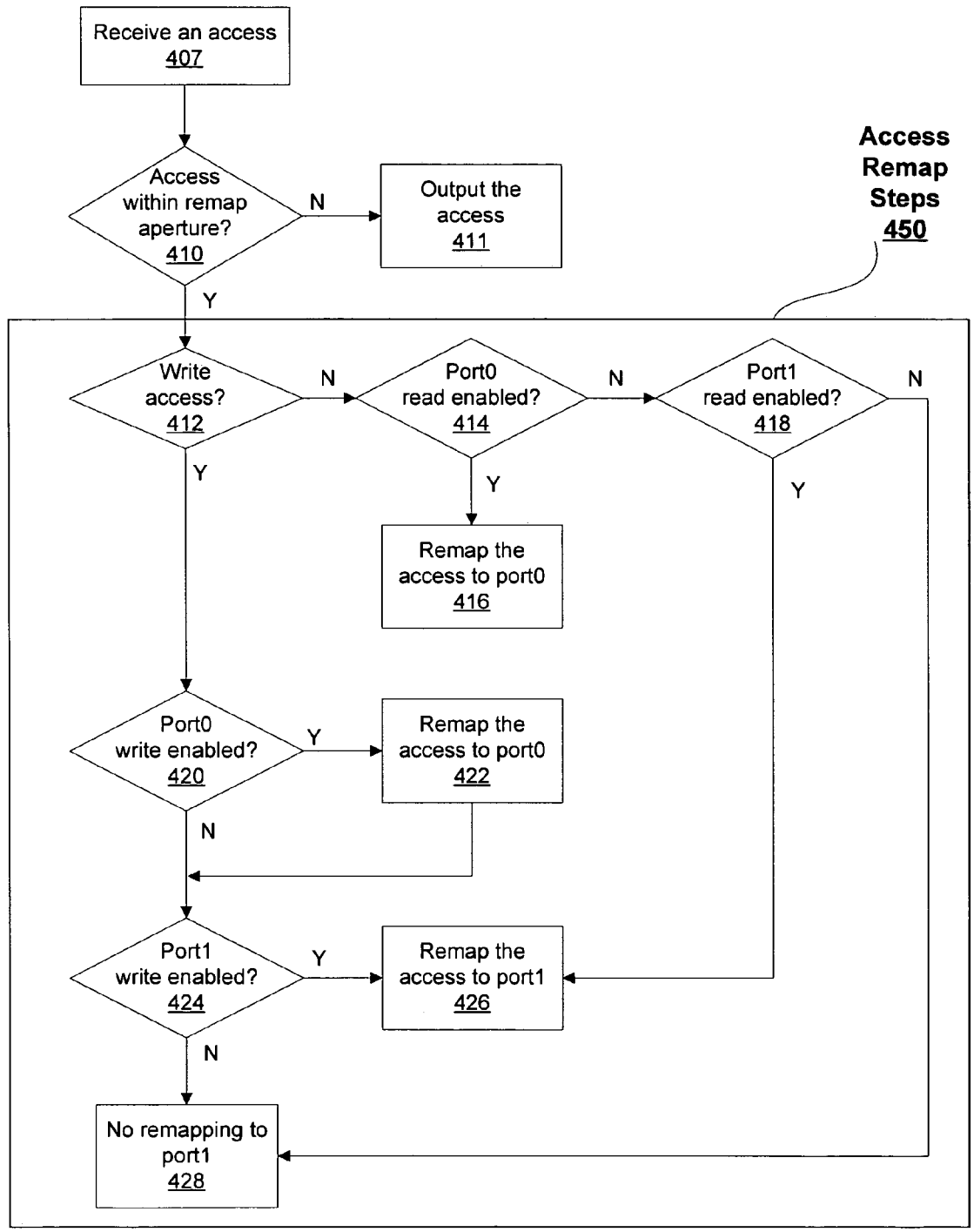
FIG. 4B is an exemplary embodiment of a method of remapping memory accesses in accordance with one or more aspects of the present invention.

FIG. 4B is an exemplary embodiment of a method of remapping memory accesses in accordance with one or more aspects of the present invention. In step 407 switch 160 receives an access from chipset 130 with an associated address that is within the memory space assigned to the multiple graphics devices. Specifically, the memory address associated with the access is within a register space or frame buffer space that may include bloated register spaces, such as bloated register space 300 or bloated register space 306

In step 410 routing unit 400 determines if the address is within a remapping aperture. Specifically, memory access unit 405 compares the address with one or more remapping apertures defined by values stored in remap registers 402. If, in step 410 memory access unit 405 determines that the address is not within a remapping aperture, then in step 411 switch 160 outputs the access to the graphics device corresponding to the memory space. If, in step 410 memory access unit 405 determines that the address is within a remapping aperture, then memory access unit 405 proceeds to access remap steps 450 and in step 412 memory access unit 405 determines if the access is a write access.

If, in step 412 memory access unit 405 determines the access is not a write access, then in step 414 memory access unit 405 determines if port0 is read enabled, i.e., if read accesses are enabled for port0. If, in step 414 memory access unit 405 determines that port0 is read enabled, then in step 416 memory access unit 405 remaps the access received in step 407 to port0.

In some embodiments of the present invention, memory access unit 405 computes a remapped address for port0, port0_address, using the following equation:

$$\text{port0\_address} = \text{port0 base} + \text{address} - \text{remap base address},$$

where port0 base is the physical base address of the port0 memory address space, address is the address associated with the access received in step 407, and remap base address is the base address of the remapping aperture specified by a set of registers within remap registers 402. In some embodiments of the present invention, the high bits of port0_address, such as bits 32 through 63, are equal to the high bits of port base 255 and the low bits of port0_address, e.g., [31:0], are computed using the previous equation. In some embodiments of the present invention, port0 base is defined for each remap aperture.

If, in step 414 memory access unit 405 determines that port0 is not read enabled, then in step 418 memory access unit 405 determines if port1 is read enabled. If in step 418 memory access unit 405 determines that port1 is read enabled, then in step 426 memory access unit 405 remaps the access to port1. If, in step 418 memory access unit 405 determines that port1 is not read enabled, then in step 428 the access is not remapped to port1.

As previously described in conjunction with step 416 regarding port0, in some embodiments of the present invention, memory access unit 405 computes a remapped address for port1, port1_address, using the following equation:

$$\text{port1\_address} = \text{port1 base} + \text{address} - \text{remap base address},$$

where port1 base is the physical base address of the port1 memory address space, address is the address associated with the access received in step 407, and remap base address is the base address of the remapping aperture specified by a set of registers within remap registers 402. In some embodiments of the present invention, the high bits of port1_address, such as bits 32 through 63, are equal to the high bits of port base 255 and the low bits of port1_address, e.g., [31:0], are computed using the previous equation. In some embodiments of the present invention, port1 base is defined for each remap aperture.

If, in step 412 memory access unit 405 determines the access is a write access, then in step 420 memory access unit 405 determines if port0 is write enabled i.e., if write accesses are enabled for port0. If, in step 420 memory access unit 405 determines that port0 is write enabled, then in step 422 memory access unit 405 remaps the access to port0 and proceeds to step 424. If, in step 420 memory access unit 405 determines that port0 is not write enabled, then in step 424 memory access unit 405 determines if port1 is write enabled. If, in step 424 memory access unit 405 determines that port1 is write enabled, then in step 426 memory access unit 405 remaps the access to port1. If, in step 424 memory access unit 405 determines that port1 is not write enabled, then in step 428 the access is not remapped to port1.

Therefore, accesses to a bloated memory space may be transmitted by switch 160 to one or more of the graphics devices dependent on write and read enables specified for each of the graphics devices. Specifically, accesses within a remapping aperture may be redirected to one graphics device, such as graphics adapter 165, and accesses outside of the remapping aperture are output to another graphics device, the graphics device reporting the bloated register space requirement. While read accesses are remapped to a single graphics device, write accesses within a remapping aperture, may be broadcast to all of the graphics devices by enabling write access for all of the graphics devices.

The device address space includes a non-prefetchable memory space, e.g., register memory, and a prefetchable memory space, e.g., frame buffer memory. In addition to remapping apertures, the prefetchable memory space may include one or more redirection regions. Accesses within a redirection region of the prefetchable memory space are only transmitted to a single graphics device. Switch 160 may be programmed to specify redirection regions within the prefetchable memory space to permit write accesses to only one of the multiple graphics devices while write accesses to portions of the prefetchable memory space lying outside of any of the redirection regions and within a remap aperture may be broadcast to all of the multiple graphics devices. Therefore, a single write access may be broadcast to write each frame buffer, thereby using less system bandwidth compared with separately writing each frame buffer. However, regions of the prefetchable memory may be identified for redirection to a single graphics device so that multiple graphics devices may each access a single surface memory space.

Figure 5A:
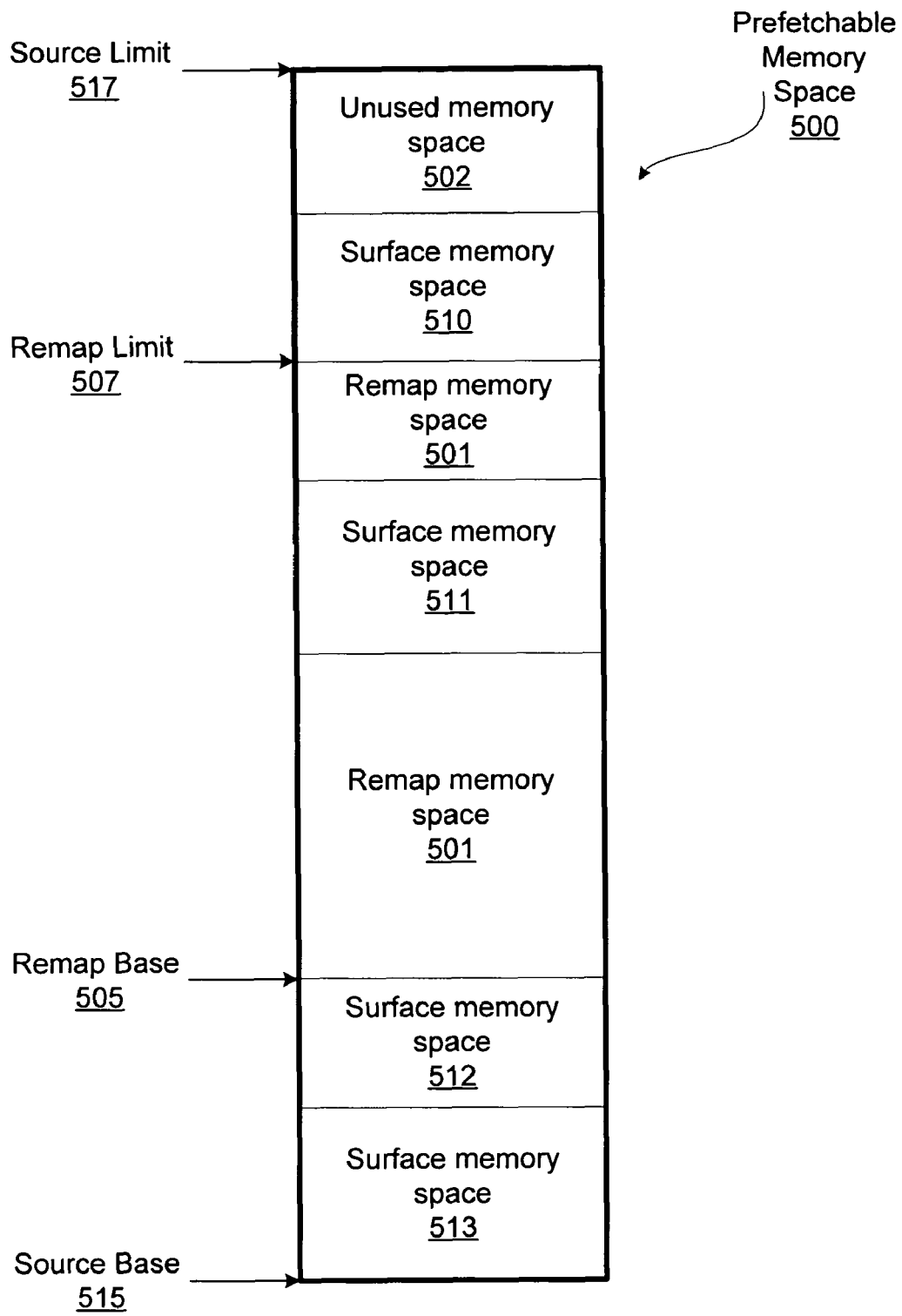
FIG. 5A is a conceptual diagram of a prefetchable memory space for multiple graphics devices in accordance with one or more aspects of the present invention.

FIG. 5A is a conceptual diagram of a prefetchable memory space for multiple graphics devices in accordance with one or more aspects of the present invention. Within the device address space, a prefetchable memory space 500 is defined by a source base 515 and a source limit 517. Graphics driver 105 programs switch 160 to recognize that accesses to addresses bounded by source base 515 and source limit 517 are within prefetchable memory space 500.

Within prefetchable memory space 500, redirection regions may be specified, such as surface memory space 510, 511, 512, and 513. Data stored in a surface memory space is typically image data intended for display on a display device. An access that lies within a redirection region is only transmitted to a single graphics device by switch 160. A redirection region may be further divided into portions and each portion may correspond to a particular graphics device, as described below in conjunction with FIGS. 5B and 5C. Therefore, a first portion within a redirection region may correspond to a first graphics device and a second portion within a redirection region may correspond to a second graphics device. Similarly, a redirection region may be divided into N portions corresponding to N graphics devices.

Within prefetchable memory space 500 one or more remap memory spaces, such as remap memory space 501, may be defined. Remap memory space 501 is bounded by remap base 505 and remap limit 505. An unused memory space 502 includes any memory space within prefetchable memory 500 that is not defined as remap memory space or surface memory space.

An access that lies within remap memory space 501 and outside of a surface memory space may be transmitted, i.e., broadcast, to each graphics device coupled to an enabled port of switch 160. Performing write operations within remap memory space 501 is an efficient mechanism for transferring graphics data, such as texture map data or program instructions, to all of the graphics devices. Each graphics device, such as graphics processor 150 or primary graphics processor 140, stores graphics data that is broadcast to a local frame buffer, such as frame buffer 155 or primary frame buffer 145, respectively.

Figure 5B:
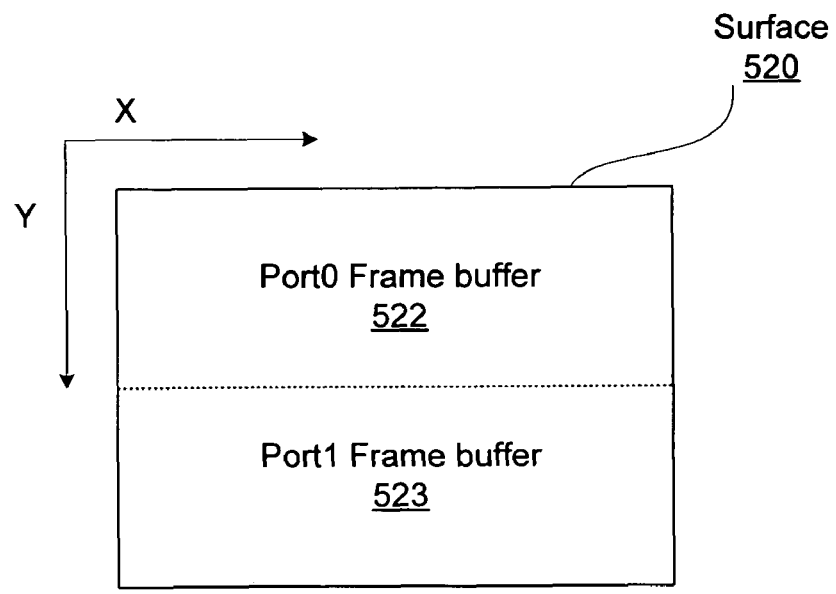
FIG. 5B is an exemplary graphics surface including image data provided by multiple frame buffers represented as a unified frame buffer in accordance with one or more aspects of the present invention.

FIG. 5B is an exemplary graphics surface 520, including image data provided by multiple frame buffers, represented as a unified frame buffer in accordance with one or more aspects of the present invention. In a conventional graphics processing system, the image data for a surface is stored in a single frame buffer. The image data for surface 520, however, is stored in multiple frame buffers, specifically a port0 frame buffer 522 and a port1 frame buffer 523, where port0 may be the first port of switch 160 and port1 may be the second port of switch 160. In some embodiments of the present invention, port0 frame buffer 522 corresponds to primary frame buffer 145 and port1 frame buffer 523 corresponds to frame buffer 155. As previously described, the image data for a surface may be stored in N different frame buffers, however, the image data appears to be stored in a unified frame buffer to an application program.

Although surface 520 is split into two contiguous portions, in other embodiments of the present invention, surface 520 may be divided into different portions. For example, one frame buffer may provide the even scanline image data and another frame buffer may provide the odd scanline image data. Alternatively, each frame buffer may provide a portion of the image data defined by specific x,y pixel positions. Furthermore, each frame buffer does not have to provide an equal portion of the image data; rather processing of the image data may be distributed between the multiple graphics devices based on several factors, including the processing performance of each particular graphics device and the complexity of different portions of the image.

Figure 5C:
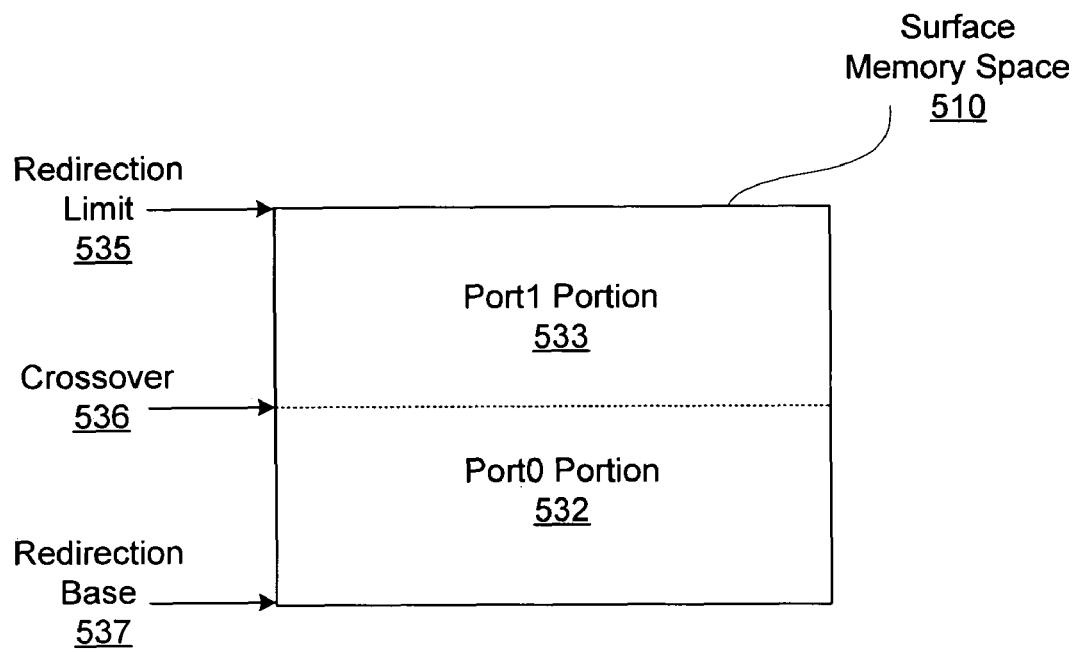
FIG. 5C is a conceptual diagram of a surface memory space accessible by multiple frame buffers in accordance with one or more aspects of the present invention.

FIG. 5C is a conceptual diagram of surface memory space distribution for multiple frame buffers in accordance with one or more aspects of the present invention. Surface memory space 510 within prefetchable memory space 500 may store image data for a surface, such as surface 520 of FIG. 5B. Specifically, surface memory space 510 is specified by two addresses, a redirection base 537 and a redirection limit 535. One or more additional addresses, crossover addresses, such as crossover 536, are specified to divide surface memory space between two or more portions, where each portion is stored in frame buffer memory of a different graphics device. A set of values including a base, limit, and at least one crossover, is stored for each surface memory space. Each set of values may correspond to one application program. When processing of an image is distributed between N graphics processors, N−1 crossovers are used to divide a surface memory space corresponding to the image among the frame buffers of the N graphics processors.

Addresses for a redirection limit 535, redirection base 537, and crossover 536 are programmed by graphics driver 105 into switch 160. Switch 160 determines to which port(s) to output each access based on the address associated with the access, as described in further detail below in conjunction with FIGS. 6A and 6B. An access within surface memory space 510 with an address greater than or equal to redirection base 537 and less than crossover 536 is within a port0 portion 532 of surface memory space 510 and is output to port0 of switch 160. An access within surface memory space 510 with an address greater than or equal to crossover 536 and less than or equal to redirection limit 535 is within a port1 portion 532 of surface memory space 510 and is output to port1 of switch 160.

Figure 5D:
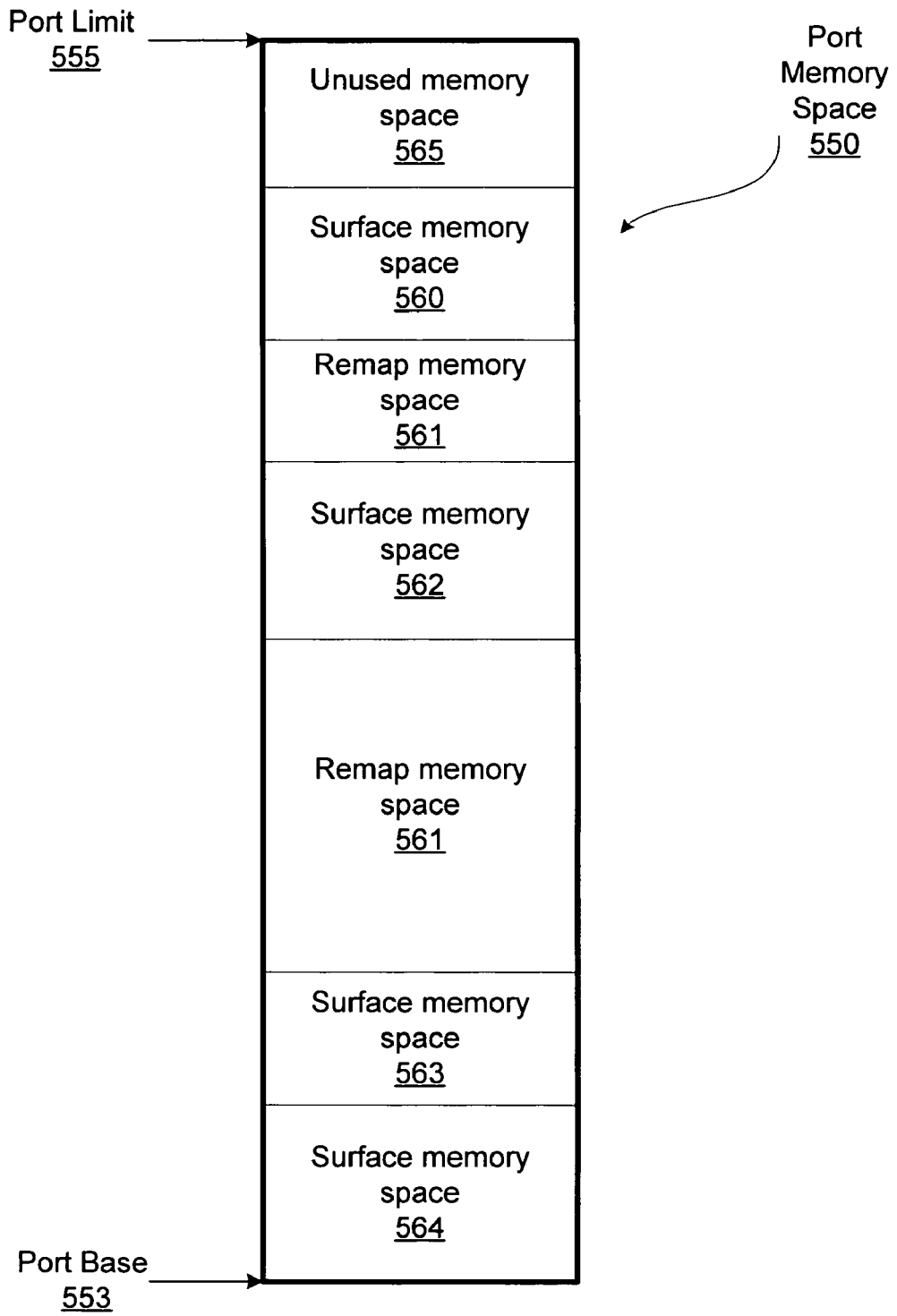
FIG. 5D is a conceptual diagram of prefetchable memory space for a port in accordance with one or more aspects of the present invention.

FIG. 5D is a conceptual diagram of a prefetchable memory space for a particular port, a port memory space 550, in accordance with one or more aspects of the present invention. Port memory space 550 may be all or a portion of a frame buffer memory coupled to a graphics device. Just as prefetchable memory, such as prefetchable memory space 500, is divided into surface memory spaces defined by redirection regions and a remap memory space defined by a remapping aperture, port memory 550 is also divided into corresponding surface memory spaces 560, 562, 563, and 565, and a remap memory space 561. Port memory space 550 is bounded by addresses within physical memory, specifically, frame buffer memory coupled to a graphics device. For example, a port base 553 and a port limit 555 are physical addresses bounding port memory space 550.

Port base 553 and port limit 555 are determined by BIOS 102 based on memory configuration information reported by a graphics device, such as graphics adapter 164 or 165, coupled to switch 160. Switch 160 is programmed with physical address information to translate addresses within prefetchable memory space 500 to physical addresses within one or more port memory spaces, such as port memory space 550.

Each surface memory space within port memory 550 corresponds to a specific redirection region within prefetchable memory space 500. For example, in one embodiment of the present invention, surface memory spaces 560, 562, 563, and 564 correspond to surface memory spaces 510, 511, 512, and 513, respectively. Likewise, remap memory space 561 and unused memory space 565 within port memory 550 correspond to remap memory space 501 and unused memory space 502, respectively, within prefetchable memory space 500. In some embodiments of the present invention, the organization of surface and/or remap memory spaces within port memory 550 may be arbitrary because each surface and/or remap memory space within port memory 550 has a specific base address.

Figure 6A:
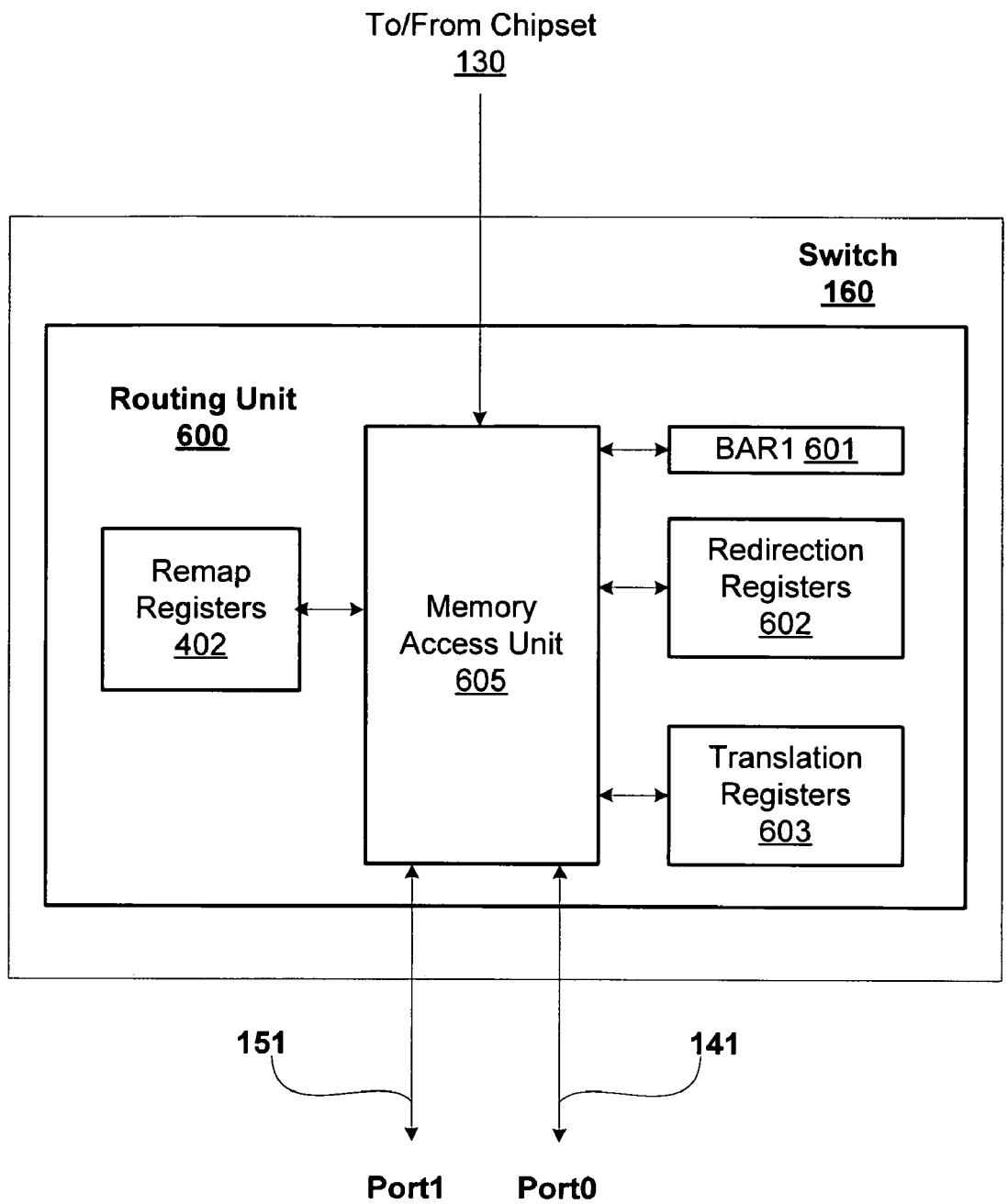
FIG. 6A is an exemplary embodiment of the switch device shown in FIG. 1 in accordance with one or more aspects of the present invention.

FIG. 6A is an exemplary embodiment of switch 160 shown in FIG. 1 in accordance with one or more aspects of the present invention. Although only a routing unit 600 is shown within switch 160, other subunits may be included to perform other functions. Routing unit 600 includes remap registers 402 and a memory access unit 605 which performs some of the functions performed by previously described memory access unit 405. Remap apertures may be defined in prefetchable memory space and in non-prefetchable memory space and redirection regions may be defined only within prefetchable memory space. A BAR1 601 register within routing unit 600 stores one or more values, such as source limit 517 and source base 515, specifying the prefetchable memory space. The one or more values stored in BAR1 601 are programmed based on the prefetchable memory requirement reported to BIOS 102 by the multiple graphics devices.

Graphics driver 105 programs values stored in redirection registers 602 and translation registers 603. Redirection registers 602 store values, e.g., addresses, specifying one or more redirection regions within the prefetchable memory space. In some embodiments of the present invention, redirection registers 602 stores 32 sets of values, e.g., base, limit, and at least one crossover, to support 32 application programs. Translation registers 603 store one or more values, e.g., addresses, each value specifying a physical address, e.g. port base, for one port of switch 160. For example, a port0 base address value may correspond to the base address of the frame buffer coupled to port0 of switch 160 via a graphics device.

A memory access unit 605 uses the one or more values programmed in BAR1 601, remap registers 402, and redirection registers 602 to determine whether an access received by switch 160 from chipset 130 should be output to any, all, or only one of port0 or port1, as described below in conjunction with FIG. 6B. Memory access unit 605 uses the one or more values programmed in translation registers 603 and BAR1 601 to convert an address received from chipset for each access that lies within a redirection region into an address for output to either port0 or port1. Likewise, memory access unit 605 uses the one or more values programmed in remap registers 402 to convert an address received from chipset for each access that lies within a remap aperture and outside of any redirection region into addresses for output to port0 and/or port1, as the case may be.

Figure 6B:
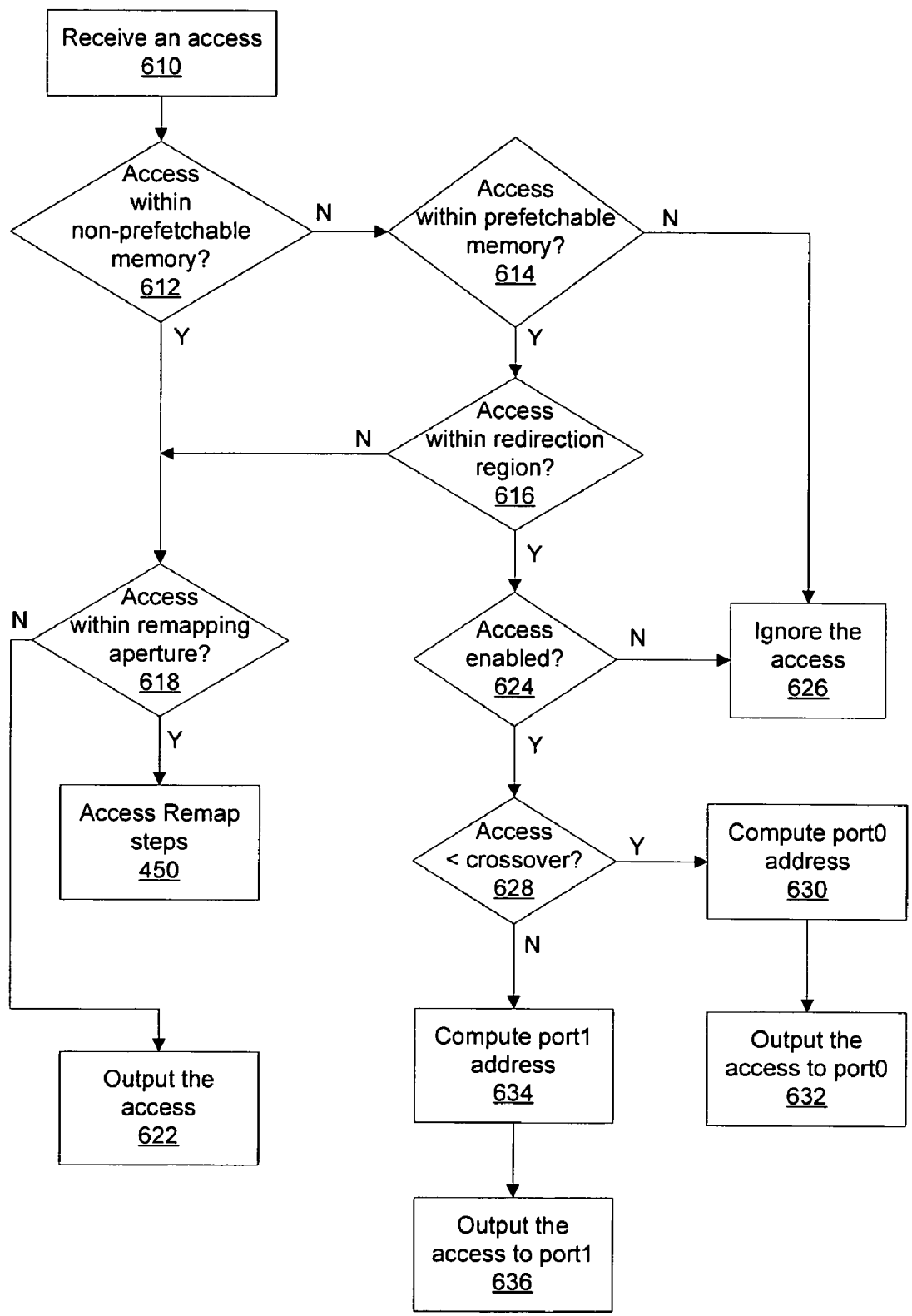
FIG. 6B is an exemplary embodiment of a method of redirecting memory accesses in accordance with one or more aspects of the present invention.

FIG. 6B is an exemplary embodiment of a method of redirecting memory accesses in accordance with one or more aspects of the present invention. In step 610 switch 160 receives an access from chipset 130 that is within the memory space assigned to the multiple graphics devices. In step 612, memory access unit 605 determines if an address associated with the access is within the non-prefetchable memory space. In some embodiments of the present invention registers within routing unit 600 are programmed specifying the non-prefetchable memory space, e.g., register memory space. If, in step 612, memory access unit 605 determines the memory address is not within the non-prefetchable memory space, then in step In step 614, memory access unit 605 determines if the address associated with the access is within the prefetchable memory space specified by BAR1 601. If, in step 614 memory access unit 605 determines the address associated with the access is not within the prefetchable memory space, then in step 626 memory access unit 605 ignores the access and does not transmit the access to either port of switch 160.

If, in step 612, memory access unit 605 determines the address is within the non-prefetchable memory space, then in step 618 memory access unit 605 determines if the address is within a remapping aperture. If, in step 618 memory access unit 650 determines that the address is within a remapping aperture, then in step 620 memory access unit 650 performs the access remap steps 450 as described in conjunction with FIG. 4B. If, in step 612, memory access unit 605 determines the address is not within a remapping aperture, then in step 622 memory access unit 605 outputs the access to the graphics device corresponding to the memory space the access lies within.

If, in step 614, memory access unit 605 determines the address is within the prefetchable memory space, then in step 616 memory access unit 605 determines if the address is within a redirection region specified by a set of values stored in redirection registers 602. For example, memory access unit 605 may compare high bits of the address, such as bits 32 through 63, i.e., [63:32], to the high bits of source limit 517 and determine that the address is within the redirection region when those bits are equal. In some embodiments of the present invention, the high bits of source limit 517 are the same as the high bits of source base 515.

If, in step 616 memory access unit 605 determines the address is not within any redirection region, then memory access unit 605 proceeds to step 618 to determine if the address is within a remapping aperture. If, in step 616 memory access unit 605 determines the address is within a particular redirection region, then in step 624 memory access unit 605 determines is access is enabled for the particular redirection region. In some embodiments of the present invention access may be independently enabled or disabled for each of the 32 programmable redirection regions. If, in step 624 memory access unit 605 determines is access is not enabled for the particular redirection region, then in step 626 memory access unit 605 ignores the access and does not transmit the access to either port of switch 160.

If, in step 624 memory access unit 605 determines is access is enabled for the particular redirection region, then in step 628 memory access unit 605 determines if the address associated with the access is less than a crossover value specified for the particular redirection region. If, in step 628 memory access unit 605 determines the address associated with the access is less than the crossover value, then in step 630 memory access unit 605 reads a port0 base address value stored in translation registers 603 and computes a physical address for port0. In step 632, memory access unit 605 outputs the access, including the port0_address, to port0 of switch 160. In some embodiments of the present invention, memory access unit 605 computes an address for port0, port0_address, using the following equation:

port0_address=port0 base+address−source base, where port0 lower base is the physical base address of the port0 prefetchable memory address space, address is the address associated with the access received in step 610, and source base is the base address of the source prefetchable memory address space specified by BAR1 601. In some embodiments of the present invention, the high bits of port0_address, such as bits 32 through 63, are equal to the high bits of port base 553 and the low bits of port0_address, e.g., [31:0], are computed using the previous equation.

If, in step 628 memory access unit 505 determines the address associated with the access is not less than the crossover value, then in step 634 memory access unit 605 reads a port1 base address value stored in translation registers 603 and computes a physical address for port1, port1_address. In step 636, memory access unit 605 outputs the access, including the port1_address, to port1 of switch 160. As previously described in conjunction with step 630 (regarding port0), in some embodiments of the present invention, memory access unit 605 computes a physical address for port1, port1_address, using the following equation:

port1_address=port1 base+address−source base, where port1 base is the physical base address of the port1 prefetchable memory address space, address is the address associated with the access received in step 610, and source base is the base address of the source prefetchable memory address space specified by BAR1 601. In some embodiments of the present invention, the high bits of port1_address, such as bits 32 through 63, are equal to the high bits of port base 553 and the low bits of port1_address, e.g., [31:0], are computed using the previous equation. In other embodiments of the present invention, additional physical port addresses may be computed for additional ports. Furthermore, in other embodiments of the present invention, different techniques, known to those skilled in the art, may be used to convert addresses received from chipset 130 into physical addresses for each port of switch 160.

Read or write accesses within a redirection region of a prefetchable memory space are translated into accesses to a single port of switch 160, specifically to the single port coupled to the frame buffer storing image data for the portion of an image stored within the redirection region. Write accesses outside of any redirection region, but within a remap memory space, e.g., remapping aperture, may be broadcast to all of the ports of switch 160. Therefore, frame buffer writes to all of the graphics devices coupled to switch 160 may be efficiently performed through the remap address spaces. A unified frame buffer is presented to an application program for all frame buffer accesses because switch 160 performs the address translation for and routing to one or all of the multiple graphics devices processing and storing image data in the multiple frame buffers.

Figure 7:
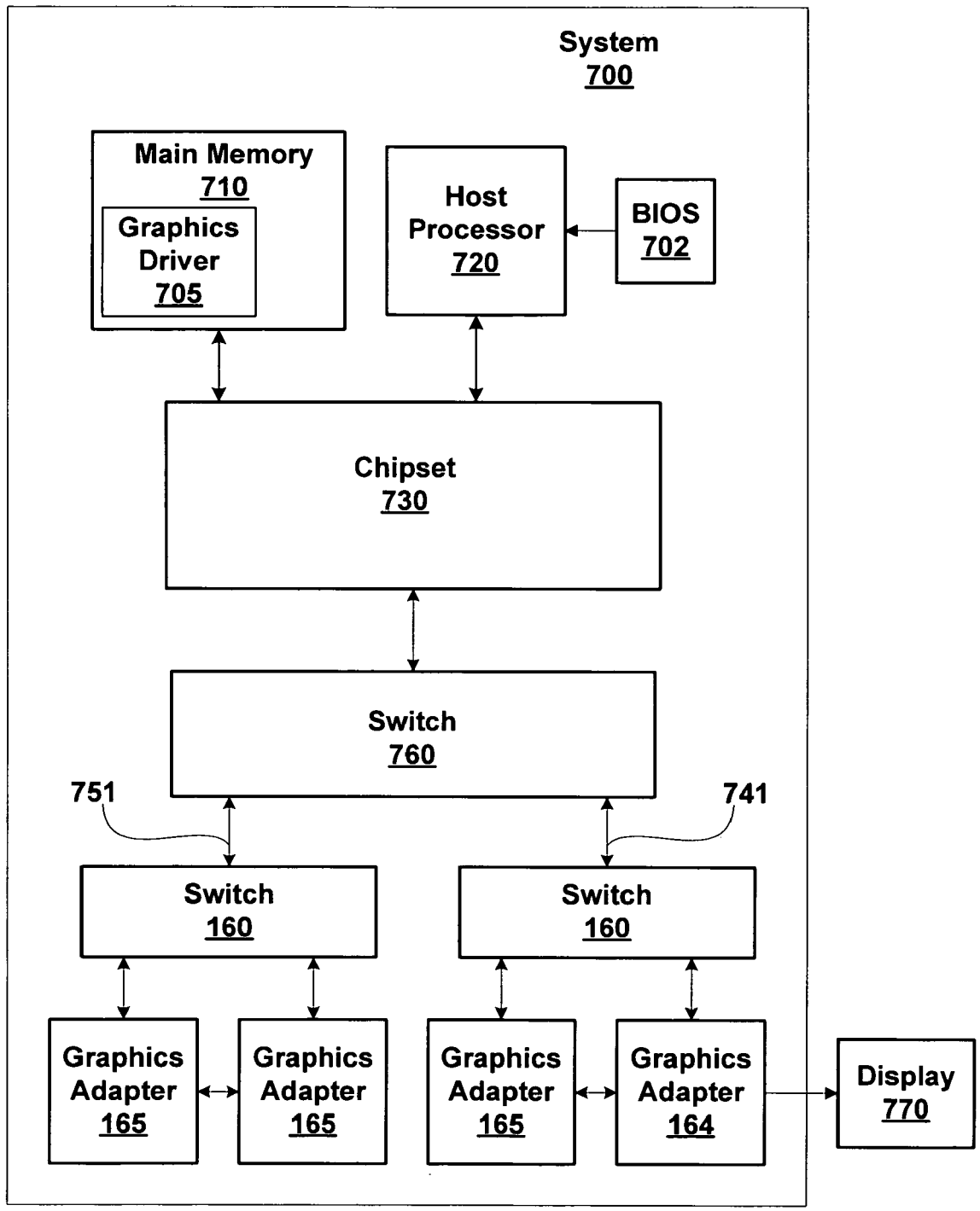
FIG. 7 is a block diagram of another exemplary embodiment of a multiple graphics adapter processing system in accordance with one or more aspects of the present invention.

FIG. 7 is a block diagram of another exemplary embodiment of a multiple graphics adapter processing system, system 700, in accordance with one or more aspects of the present invention. System 700 includes several of the elements shown in system 100. Specifically, host processor 720 corresponds to host processor 120, main memory 710 corresponds to main memory 110, BIOS 702 corresponds to BIOS 102, graphics driver 705 corresponds to graphics driver 105, and display 770 corresponds to display 170. A first graphics subsystem includes a switch 160, a graphics adapter 164, and a graphics adapter 165, as described in conjunction with FIG. 1, is coupled to switch 760 via connection 741. The first graphics subsystem outputs image data to display 770. A second graphics subsystem includes another switch 160, another graphics adapter 164, and another graphics adapter 165, and is coupled to switch 760 via connection 751.

In alternate embodiments of the present invention, the graphics processors may be replaced with other types of processors, such as audio processors, multi-media processors, or the like. Likewise, graphics driver 705 may be replaced with another driver corresponding to the other types of processors. Therefore, application programs need only communicate with a single driver to distribute processing over multiple processors.

Each of the multiple graphics devices within the graphics subsystems reports non-prefetchable memory space requirements, e.g., register space, and prefetchable memory space requirements, e.g., frame buffer memory space, to BIOS 702. Memory space is assigned to the multiple graphics devices, and remap registers 402, BAR1 601, redirection registers 602, and translation registers 603, and the like, within switch 760 and within each switch 160 are programmed to define the prefetchable memory space, non-prefetchable memory space, remapping apertures, redirection regions, and port base addresses for address translation. Graphics driver 705 communicates between the multiple graphics devices and application programs, in order to present the multiple frame buffers as a unified frame buffer.

Figure 8:
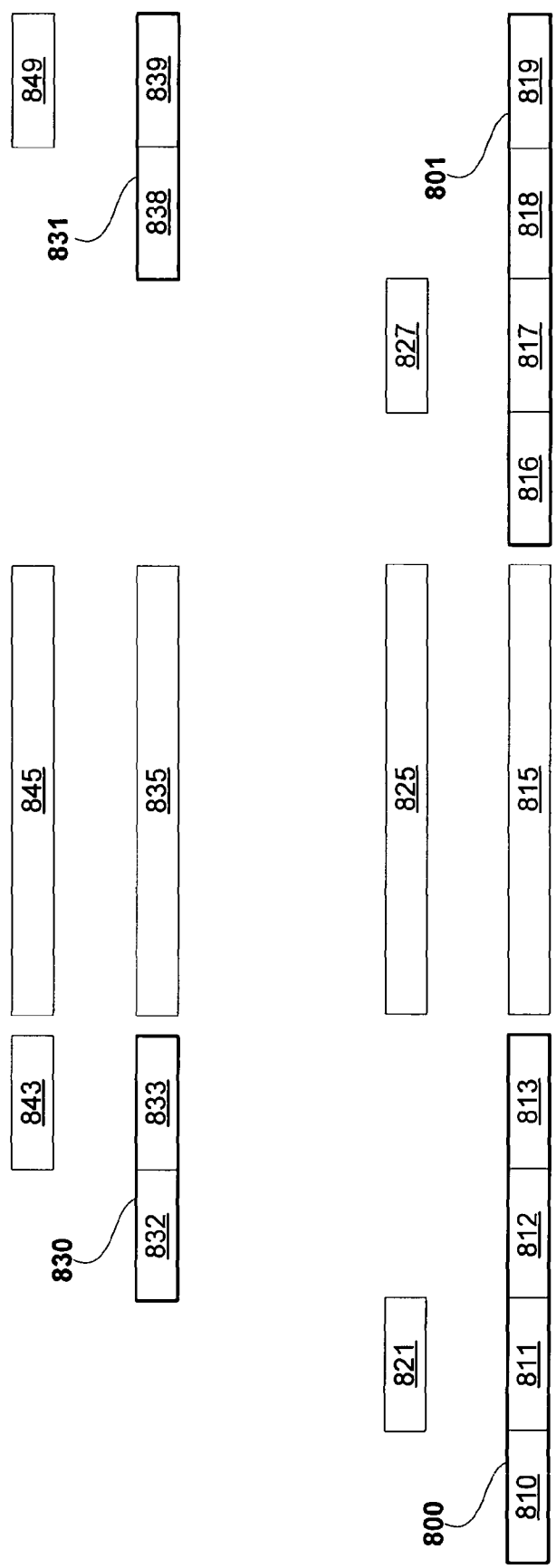
FIG. 8 is another exemplary conceptual diagram of memory space assigned to multiple graphics devices in accordance with one or more aspects of the present invention.

FIG. 8 is another exemplary conceptual diagram of memory space requirements reported for the multiple graphics devices in system 700 in accordance with one or more aspects of the present invention. A first graphics device, such as graphics adapter 164, within the first graphics subsystem, shown in FIG. 7 that is coupled to switch 760 via connection 741, reports a bloated register space 800 to BIOS 702. Bloated register space 800 includes a register space 810 that is specific to the first graphics device and a register space 811 that is specific to a second graphics device, such as graphics adapter 165, also within the first graphics subsystem. The first graphics device includes physical storage for register space 810 and the physical storage for register space 811 is within the second graphics device. The second graphics device reports a register space that is not bloated to BIOS 702, register space 821.

Register spaces 812 and 813 are also included within bloated register space 800 and are specific to the second graphics subsystem (coupled to switch 760 via connection 751) in system 700. Physical storage for register space 812 is within a third graphics device within the second graphics subsystem. Physical storage for register space 813 is within a fourth graphics device that is also within the second graphics subsystem. The third graphics device reports a bloated register space 830 to BIOS 702. Bloated register space 830 includes a register space 832 corresponding to register space 812 reported by the first graphics device and a register space 833 corresponding to register space 813 reported by the first graphics device. The fourth graphics device reports a register space that is not bloated to BIOS 702, register space 843.

As previously described, each graphics device may be configured to report a bloated register space or frame buffer memory space based on fixed or dynamic configuration information. In the configuration shown in FIG. 7, the first graphics device within the first graphics subsystem reports a bloated register space, register space 800, that is four times the size of the physical register storage within the first graphics device. The third graphics device within the second graphics subsystem reports a bloated register space, register space 830, that is twice the size of the physical register storage within the third graphics device. The second and fourth graphics devices each report register spaces that are not bloated, register space 821 and register space 843, respectively.

Register spaces 812 and 813 within bloated register space 800 may be bounded by addresses A0 and A1 and register space 811 may be bounded by addresses A2 and A4. A first switch 160 within the first graphics subsystem, a second switch 160 within the second graphics subsystem, and switch 760, may each be programmed by a single graphics driver, graphics driver 705 to define at least one remapping aperture or redirection region. Accesses received by switch 760 with associated addresses lying within register spaces 812 and 813 are remapped to the second graphics subsystem and correspond to bloated register space 830. Accesses received by switch 760 with associated addresses lying within register spaces 810 and 811 are remapped to the first graphics subsystem.

Register space 810 may be bounded by addresses A0 and A1 and register space 811 may be bounded by addresses A1 and A2. Accesses received by first switch 160 from switch 760, with associated addresses lying within register space 811 are remapped to the second graphics device within the first graphics subsystem. For example, in some embodiments of the present invention, addresses greater than or equal to A1 and less than A2 are translated into corresponding addresses within register space 821 which is bounded by addresses B0 and B1. In some embodiments of the present invention, the address associated with the access is translated using values stored in registers within first switch 160 of the first graphics subsystem to produce a remapped address within register space 821.

Register space 812 may be bounded by addresses A2 and A3 and register space 813 may be bounded by addresses A3 and A4. Switch 760 remaps accesses to register spaces 812 and 813 to the second graphics device. Specifically, register space 812 corresponds to register space 832 which may be bounded by addresses C0 and C1 and register space 813 corresponds to register space 833 which may be bounded by addresses C1 and C2. In some embodiments of the present invention, the addresses associated with an access that lies within register spaces 812 and 813 are translated using values stored in registers within switch 760 to produce remapped addresses within register space 830.

Accesses received by the second switch 160 from switch 760, with associated addresses lying within register space 833 are remapped to the second graphics device within the first graphics subsystem. For example, in some embodiments of the present invention, addresses greater than or equal to C1 and less than C2 are translated into corresponding addresses within register space 843 which is bounded by addresses D0 and D1. In some embodiments of the present invention, register spaces 843, 832, 821, and 810 are used for configuration registers and are programmed by an application program via graphics driver 705.

The first graphics device within the first graphics subsystem also reports a bloated register space 801 including a register space 816 that is specific to the first graphics device, a register space 817 that is specific to the second graphics device, a register space 818 that is specific to the third graphics device, a register space 819 that is specific to the fourth graphics device. The third graphics device within the second graphics subsystem reports a bloated register space 831, including register spaces 838 and 839 corresponding to register spaces 818 and 819, respectively. The first graphics device includes physical storage for register space 816, physical storage for register space 817 is within the second graphics device, physical storage for register spaces 818 and 819 is within the second graphics subsystem. The second graphics device and the fourth graphics device each report a register space that is not bloated, register spaces 827 and 849, respectively. In some embodiments of the present invention, additional register spaces are reported by graphics subsystems within system 700. In some embodiments of the present invention, register spaces 816, 827, 838, and 849 are instance registers used to store the locations of data structures stored in prefetchable memory, e.g., frame buffer memory.

The first and second graphics subsystems each report a frame buffer memory space that is not bloated, frame buffer memory spaces 815 and 835, respectively. As previously described, the multi-adapter configuration information may specify whether or not to bloat register spaces separately from frame buffer memory spaces. Switch 760 may be programmed to define one or more redirection regions within frame buffer memory space 815.

In some embodiments of the present invention, switch 760 is programmed to define a remapping aperture within frame buffer memory space 815 such that, all accesses within frame buffer memory space 815 are broadcast to frame buffer memory space 835 and frame buffer memory space 815. Likewise, first switch 160 within the first graphics subsystem may be programmed to define a remapping aperture within frame buffer memory space 815 such that all accesses within frame buffer memory space 815 are broadcast to frame buffer memory space 825 and frame buffer memory space 815. Similarly, second switch 160 within the second graphics subsystem may be programmed by graphics driver define a remapping aperture within frame buffer memory space 815 such that all accesses within frame buffer memory space 835 are broadcast to a frame buffer memory space 845 and frame buffer memory space 835. Therefore, accesses to frame buffer memory space 815 may be received by each graphics adapter in system 700. Furthermore, redirection regions may be defined within frame buffer memory space 815 such that each of the graphics devices may store a portion of a surface memory space.

Figure 9A:
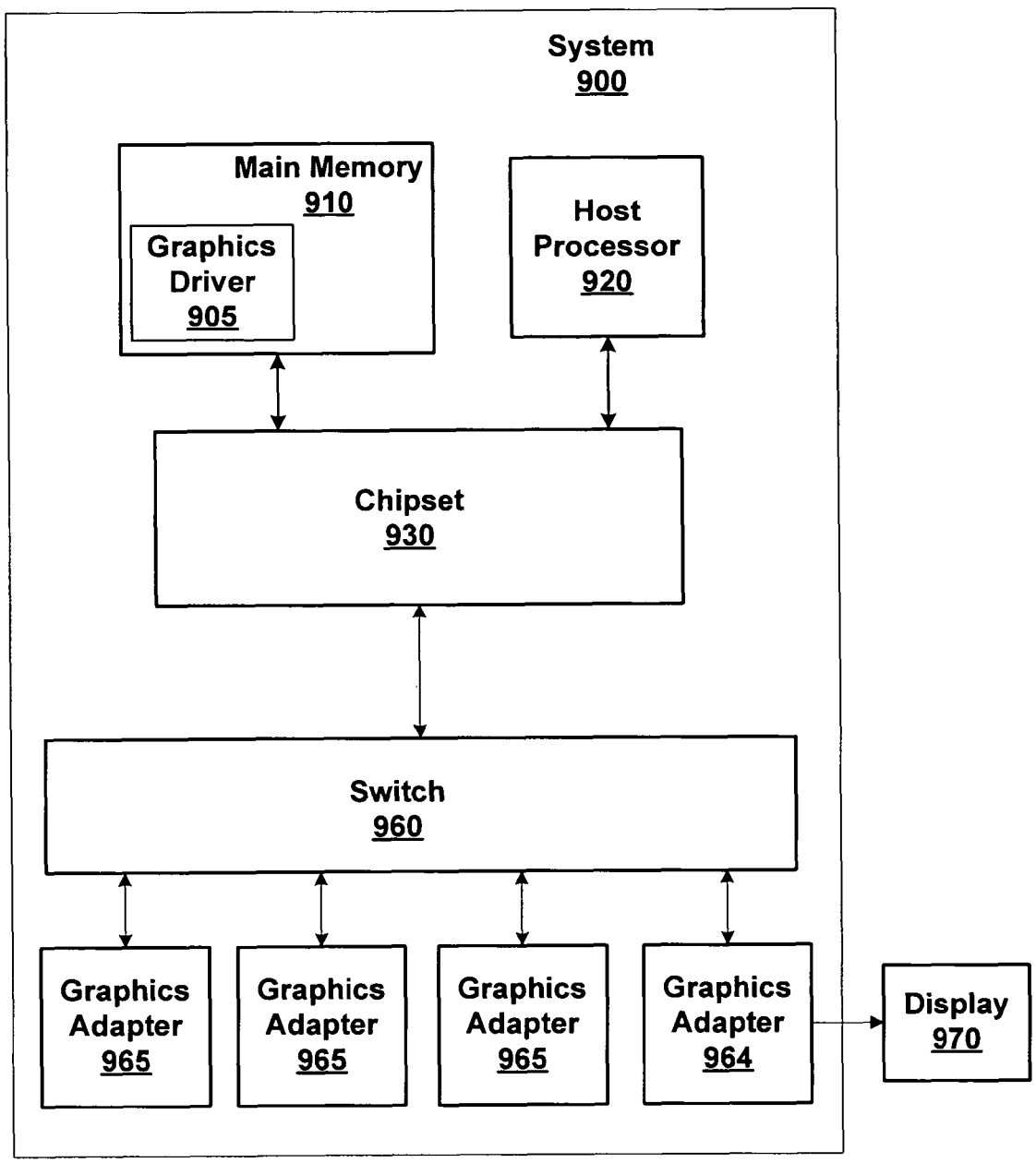
FIG. 9A is a block diagram of another exemplary embodiment of a multiple graphics adapter processing system in accordance with one or more aspects of the present invention.

FIG. 9A is a block diagram of another exemplary embodiment of a multiple graphics adapter processing system, system, 900, in accordance with one or more aspects of the present invention. System 900 includes several of the elements shown in systems 100 and 700. Specifically, host processor 920 corresponds to host processor 120, main memory 910 corresponds to main memory 110, graphics driver 905 corresponds to graphics driver 105, and display 970 corresponds to display 170. A graphics adapter 964 corresponds to graphics adapter 164 and each graphics adapter 965 corresponds to graphics adapter 165. Graphics adapter 964 outputs image data to display 970. A switch 960, similar to switch 160, interfaces between chipset 930 and multiple graphics devices, graphics adapter 964 and graphics adapters 965. Switch 960 includes four ports, where each port is configured to interface with a graphics device. Likewise, switch 960 may include four or more sets of registers defining remapping aperture values, such as base and limit addresses, and port specific values including a base address for translating access addresses into remapped addresses. Switch 960 may also include a BAR1 register, redirection registers, and translation registers for defining redirection regions for a prefetchable memory space.

In alternate embodiments of the present invention, the graphics processors may be replaced with other types of processors, such as audio processors, multi-media processors, or the like. Likewise, graphics driver 905 may be replaced with another driver corresponding to the other types of processors. Therefore, application programs need only communicate with a single driver to distribute processing over multiple processors.

Figure 9B:
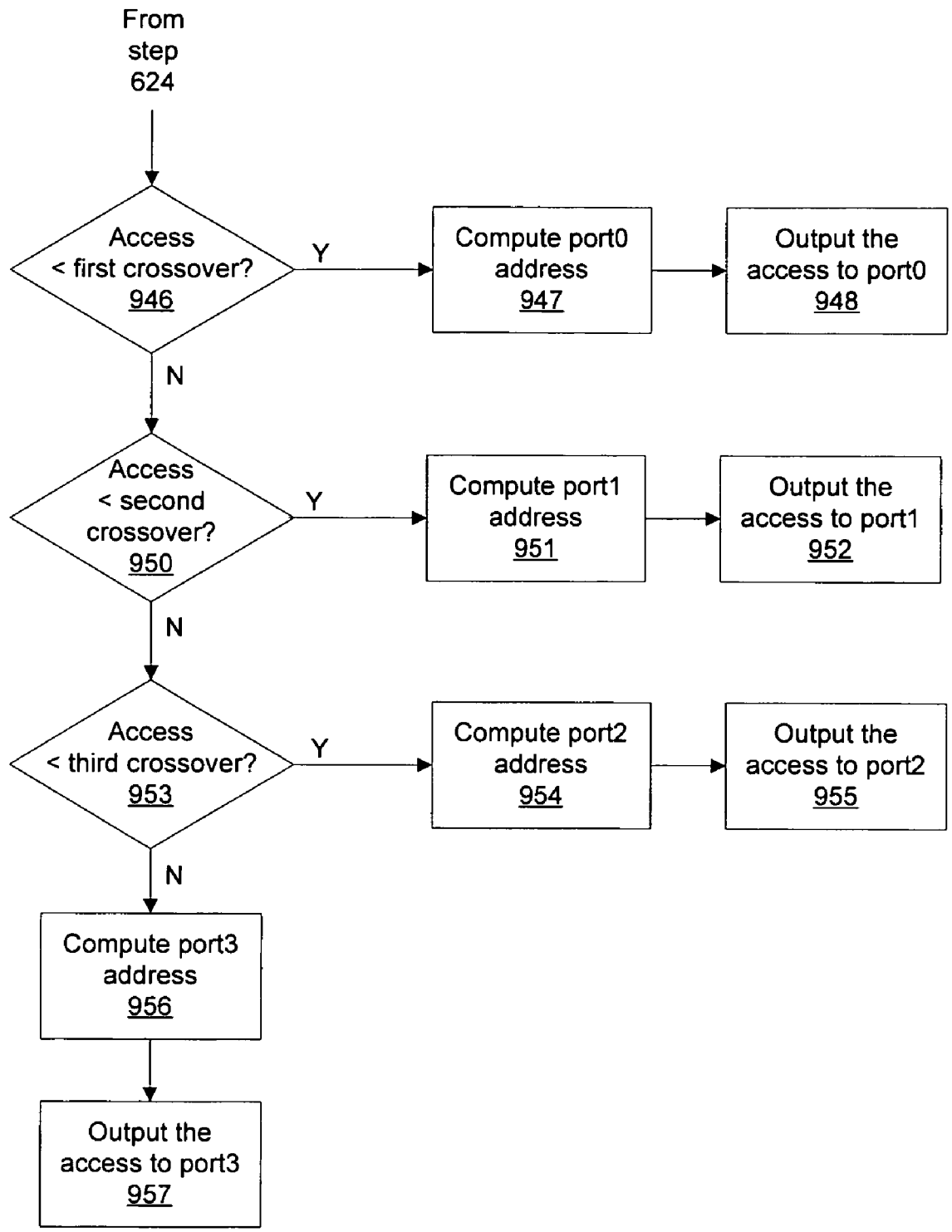
FIG. 9B is an exemplary embodiment of a method of redirecting memory accesses in accordance with one or more aspects of the present invention.

FIG. 9B is an exemplary embodiment of another method of redirecting prefetchable memory accesses in accordance with one or more aspects of the present invention. Steps 640, 641, and 643 of FIG. 6B are completed as previously described and in step 946 a memory access unit within switch 960 determines if the address associated with the access is less than a first crossover value. If, in step 946 the memory access unit determines the address associated with the access is less than the first crossover value, then in step 947 the memory access unit uses the address received in step 640 to compute a port specific physical address for port0 of switch 960. In step 948 the prefetchable memory access unit outputs the access, including the computed physical address for port0 to graphics adapter 964 that is coupled to the port0 of switch 960.

If, in step 946 the memory access unit determines the address associated with the access is not less than the first crossover value, then in step 950 the memory access unit determines if the address associated with the access is less than a second crossover value. If, in step 950 the memory access unit determines the address associated with the access is less than the second crossover value, then in step 951 the memory access unit uses the address received in step 940 to compute a port specific physical address for port1 of switch 960. In step 952 the memory access unit outputs the access, including the computed physical address for port1 to graphics adapter 965 that is coupled to the port1 of switch 960.

If, in step 950 the memory access unit determines the address associated with the access is not less than the second crossover value, then in step 953 the memory access unit determines if the address associated with the access is less than a third crossover value. If, in step 953 the memory access unit determines the address associated with the access is less than the third crossover value, then in step 954 the memory access unit uses the address received in step 940 to compute a port specific physical address for port2 of switch 960. In step 955 the memory access unit outputs the access, including the computed physical address for port2 to graphics adapter 965 that is coupled to the port2 of switch 960.

If, in step 953 the memory access unit determines the address associated with the access is not less than the third crossover value, then in step 956 the memory access unit uses the address received in step 940 to compute a port specific physical address for port3 of switch 960. In step 957 the memory access unit outputs the access, including the computed physical address for port3 to graphics adapter 965 that is coupled to the port3 of switch 960.

Graphics adapters 965 and graphics adapter 964, process accesses received from switch 960 via port0, port1, port2, and port3, according to the steps described in conjunction with FIG. 9B. In other embodiments of the present invention, additional ports may be provided by switch 960. In some embodiments of the present invention, the ports of switch 960 may each be coupled to a switch device, such as switch 160, switch 760, or switch 960. In those embodiments switch 960 is programmed to output addresses to the four ports.

Each of the multiple graphics devices reports memory space requirements for register space and frame buffer space and a single device driver, graphics driver 905 is used to communicate between an application program and the multiple graphics devices. In some embodiments of the present invention, graphics adapter 964 may report a bloated memory space requirement, including memory space for each of the graphics adapters 965. Furthermore, redirection regions may be defined within frame buffer memory so that the application program can distribute processing of an image between the multiple graphics devices. Image data for a surface may be processed by the multiple graphics devices, with portions of the surface residing in separate frame buffers, each frame buffer coupled to one of the multiple graphics devices.

While the foregoing is directed to embodiments of the present invention, other and further embodiments of the invention may be devised without departing from the basic scope thereof, and the scope thereof is determined by the claims that follow. Specifically, persons skilled in the art will recognize that the methods and systems described may be used for processing data other than graphics data where the data is used by processors in a multi-processing data processing system. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A multiple graphics adapter processing system, comprising:
   a first graphics device having a first associated frame buffer configured to store graphics data associated with the first graphics device;
   a second graphics device having a second associated frame buffer configured to store graphics data associated with the second graphics device; and
   a bridge device configured to:
      store a first memory range defining a redirection region corresponding to a bloated register space within a prefetchable memory address space and a second memory range defining a remap region within the prefetchable memory address space, wherein a first portion of the first memory range is associated with the first graphics device and a second portion of the first memory range is associated with the second graphics device, and wherein each memory address in the second memory range is associated with both the first graphics device and the second graphics device, and output a memory access associated with the prefetchable memory address space to both the first graphics device and the second graphics device when a first memory address associated with the memory access is within the second memory range and outside the first memory range, wherein the first graphics device is configured to specify a bloated register space requirement that indicates the size of the bloated register space within the prefetchable memory address space.

2. The system of claim 1, wherein the memory access includes a write access.

3. The system of claim 1, wherein the bridge device is further configured to output the memory access to only the first graphics device or to only the second graphics device when the first memory address is within the first memory range.

4. The system of claim 3, wherein the bridge device is configured to output the memory access to the first graphics device when the first memory address is less than a crossover value that defines the division of the redirection region into the first and second portions.

5. The system of claim 3, wherein the bridge device is configured to output the memory access to the second graphics device when the first memory address is greater than or equal to a crossover value that defines the division of the redirection region into the first and second portions.

6. The system of claim 1, further comprising a single device driver configured to interface between the first graphics device and the second graphics device and an application program.

7. The system of claim 1, further comprising a third graphics device coupled to the bridge device.

8. A method of accessing a frame buffer that is divided between multiple graphics devices as a unified frame buffer, comprising:

defining a redirection region corresponding to a bloated register space within a prefetchable memory space and a remap region within the prefetchable memory space for storing image data for display on a display device, wherein each memory address in the remap region is associated with each of the multiple graphics devices, and wherein a first graphics device is configured to specify a bloated register space requirement that indicates the size of the bloated register space, within the prefetchable memory address space;

dividing the redirection region into a plurality of portions, each portion of the redirection region being associated with a different one of the multiple graphics devices; and outputting the access to one or more of the multiple graphics devices depending on whether an address associated with the access is either within the redirection region or within the remap region, wherein the memory access is output to two or more of the multiple graphics devices when the address associated with the memory access is within the remap region and outside the redirection region.

9. The method of claim 8, further comprising determining accesses are enabled for the redirection region.

10. The method of claim 8, wherein the memory access is output to only the one of the multiple graphics devices when the address is within one portion of the redirection region.

11. The method of claim 10, further comprising determining the one of the multiple graphics devices based on a crossover value defined for dividing the redirection region into the plurality of portions.

12. The method of claim 8, wherein only write accesses are output to more than one of the multiple graphics devices.

13. A bridge device for interfacing between a host processor and multiple graphics devices, comprising:

a first register configured to store a value specifying a prefetchable memory space;

a redirection register configured to store a first memory range defining a redirection region corresponding to a bloated register space within the prefetchable memory space, wherein the redirection region is divided into a plurality of portions respectively adapted to store image data for display on a display device, each portion associated with a different one of the multiple graphics devices;

a remap register configured to store a second memory range defining a remap region within the prefetchable memory space, wherein the remap region is associated with each of the multiple graphics devices; and a memory access unit configured to transmit accesses to one or more ports based on the first register, the redirection register, and the remap register, wherein each of the one or more ports is coupled to a different one of the multiple graphics devices, wherein the memory access unit is configured to output a memory access associated with an address within the prefetchable memory space to two or more of the ports when the address is within the second memory range and outside the first memory range, and wherein a first graphics device is configured to specify a bloated register space requirement that indicates the size of the bloated register space within the prefetchable memory address space.

14. The bridge device of claim 13, wherein the memory access unit is configured to translate addresses associated with the memory accesses into port specific addresses for each of the one or more ports.

15. The bridge device of claim 13, wherein the memory access unit is configured to transmit memory accesses within one portion of the redirection region to only one of the ports.

16. The bridge device of claim 13, wherein the memory access unit is configured to transmit memory accesses within the remap region to two or more of the ports.

* * * * *